(12) United States Patent
Zhang et al.

(10) Patent No.: US 11,617,096 B2
(45) Date of Patent: Mar. 28, 2023

(54) POWER SAVING FOR DOWNLINK CONTROL CHANNEL MONITORING IN UNLICENSED BANDS

(71) Applicant: QUALCOMM Incorporated, San Diego, CA (US)

(72) Inventors: Xiaoxia Zhang, San Diego, CA (US); Jing Sun, San Diego, CA (US); Tao Luo, San Diego, CA (US); Sungwoo Park, San Diego, CA (US); Wooseok Nam, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 16/904,439

(22) Filed: Jun. 17, 2020

(65) Prior Publication Data

US 2020/0404586 A1    Dec. 24, 2020

Related U.S. Application Data

(60) Provisional application No. 62/865,055, filed on Jun. 21, 2019.

(51) Int. Cl.
*H04W 24/08*    (2009.01)
*H04W 16/14*    (2009.01)
(Continued)

(52) U.S. Cl.
CPC ........... *H04W 24/08* (2013.01); *H04W 16/14* (2013.01); *H04W 52/0206* (2013.01);
(Continued)

(58) Field of Classification Search
CPC combination set(s) only.
See application file for complete search history.

(56) References Cited

U.S. PATENT DOCUMENTS

2015/0296455 A1* 10/2015 Yamazaki ......... H04W 52/0254
                                                                370/311
2018/0220485 A1*  8/2018 Su .......................... H04W 68/00
(Continued)

FOREIGN PATENT DOCUMENTS

WO    WO-2019099880 A1 *  5/2019  ............ H04W 24/08

OTHER PUBLICATIONS

International Search Report and Written Opinion—PCT/US2020/038419—ISA/EPO—dated Aug. 24, 2020.
(Continued)

*Primary Examiner* — Jael M Ulysse
(74) *Attorney, Agent, or Firm* — Holland & Hart LLP/Qualcomm

(57) ABSTRACT

Methods, systems, and devices for wireless communications are described. Generally, a base station may transmit downlink control channel messages during one or more monitoring occasions using a first set of resources. The base station may perform a directional listen-before-talk (LBT) procedure on one or more beams. The base station may transmit a control message including instructions to modify monitoring of a wireless channel using the first set of resources over a second set of resources. A UE may monitor, using the first set of resources, for downlink control channel signaling during monitoring occasions according to a first monitoring pattern. The UE may receive, using the second set of resources, the control message, and may monitor the wireless channel according a second monitoring pattern based on the received control message.

30 Claims, 19 Drawing Sheets

(51) Int. Cl.

| | | |
|---|---|---|
| *H04W 52/02* | (2009.01) | |
| *H04W 72/02* | (2009.01) | |
| *H04W 72/044* | (2023.01) | |
| *H04W 74/08* | (2009.01) | |
| *H04W 72/23* | (2023.01) | |
| *H04W 92/18* | (2009.01) | |
| *H04L 27/26* | (2006.01) | |

(52) U.S. Cl.
CPC ......... *H04W 72/02* (2013.01); *H04W 72/046* (2013.01); *H04W 72/23* (2023.01); *H04W 74/0808* (2013.01); *H04L 27/2602* (2013.01); *H04W 92/18* (2013.01)

(56) References Cited

U.S. PATENT DOCUMENTS

| | | | |
|---|---|---|---|
| 2019/0104510 A1 | 4/2019 | Lee et al. | |
| 2019/0132882 A1 | 5/2019 | Li et al. | |
| 2019/0297577 A1* | 9/2019 | Lin | H04W 52/0235 |
| 2020/0045696 A1* | 2/2020 | Huang | H04W 72/23 |
| 2020/0100179 A1* | 3/2020 | Zhou | H04W 52/0209 |
| 2020/0351682 A1* | 11/2020 | Cirik | H04W 76/28 |
| 2020/0367080 A1* | 11/2020 | Salah | H04L 5/0053 |
| 2021/0076236 A1* | 3/2021 | Kimura | H04W 4/40 |
| 2021/0112536 A1* | 4/2021 | Shah | H04L 5/0048 |
| 2021/0258931 A1* | 8/2021 | Kim | H04B 7/0695 |
| 2021/0360666 A1* | 11/2021 | Yoshimura | H04W 72/1273 |
| 2022/0046541 A1* | 2/2022 | Wu | H04L 5/0048 |
| 2022/0150917 A1* | 5/2022 | Wang | H04W 72/21 |

OTHER PUBLICATIONS

Motorola Mobility et al., "Feature lead summary for NR-U DL Signals and Channels", 3GPP Draft, 3GPP TSG RAN WG1 #97, R1-1907705, 3rd Generation Partnership Project (3GPP), Mobile Competence Centre 650, Route Des Lucioles, F-06921 Sophia-Antipolis Cedex, France, vol. RAN WG1, No. Reno, USA, May 13, 2019-May 17, 2019 May 16, 2019 (May 16, 2019), XP051739988, 24 Pages, Retrieved from the Internet: URL:http://www.3gpp.org/ftp/tsg%5Fran/WG1%5FRL1/TSGR1%5F97/Docs/R1%2D1907705%2Ezip [retrieved on May 16, 2019] p. 8: "Qualcomm" p. 9: "ZTE, Sanechips" p. 16: "ITRI".

* cited by examiner

POWER SAVING FOR DOWNLINK CONTROL CHANNEL MONITORING IN UNLICENSED BANDS

CROSS REFERENCE

The present Application for Patent claims the benefit of U.S. Provisional Patent Application No. 62/865,055 by ZHANG et al., entitled "POWER SAVING FOR DOWNLINK CONTROL CHANNEL MONITORING IN UNLICENSED BANDS," filed Jun. 21, 2019, assigned to the assignee hereof, and expressly incorporated by reference herein.

BACKGROUND

The following relates generally to wireless communications, and more specifically to power saving for downlink control channel monitoring in unlicensed bands.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support power saving for downlink control channel monitoring in unlicensed bands. Generally, a base station may transmit downlink control channel messages during one or more monitoring occasions using a first set of resources (e.g., spatial or frequency or time resources). The base station may perform a directional listen-before-talk (LBT) procedure on one or more beams, and may determine that the directional LBT procedure was successful for a set of allowed beams and unsuccessful for a set of non-allowed beams. The base station may transmit a control message to a UE that cannot receive downlink control signaling over the allowed beams. The control message may include instructions to modify monitoring of a wireless channel using the first set of resources (e.g., using one or more allowed beams). The base station may send the control message over a second set of resources. A UE may monitor, using the first set of resources, for downlink control channel signaling during monitoring occasions according to a first monitoring pattern. The UE may receive, using the second set of resources, the control message, and may monitor the wireless channel according a second monitoring pattern based on the received control message.

A method of wireless communications at a UE is described. The method may include monitoring, using a first set of resources, a wireless channel for downlink control channel signaling during a first set of downlink control channel monitoring occasions according to a first monitoring pattern, receiving, using a second set of resources, a control message including an instruction to modify the monitoring of the wireless channel using the first set of resources, and monitoring, based on the control message, the wireless channel for downlink control channel signaling during a second set of downlink control channel monitoring occasions according to a second monitoring pattern.

An apparatus for wireless communications at a UE is described. The apparatus may include a first interface, a second interface, and a modem coupled to the first interface and the second interface. In some examples, the modem may be in communication with a transmitter via the first interface, and may output for transmission via the first interface one or more messages, as described below. The modem may also be in communication with a receiver via the second interface, and may obtain messages via the second interface. The modem may be configured to monitor, using a first set of resources, a wireless channel for downlink control channel signaling during a first set of downlink control channel monitoring occasions according to a first monitoring pattern, obtain via the second interface, using a second set of resources, a control message including an instruction to modify the monitoring of the wireless channel using the first set of resources, and monitor, based on the control message, the wireless channel for downlink control channel signaling during a second set of downlink control channel monitoring occasions according to a second monitoring pattern.

Another apparatus for wireless communications at a UE is described. The apparatus may include means for monitoring, using a first set of resources, a wireless channel for downlink control channel signaling during a first set of downlink control channel monitoring occasions according to a first monitoring pattern, receiving, using a second set of resources, a control message including an instruction to modify the monitoring of the wireless channel using the first set of resources, and monitoring, based on the control message, the wireless channel for downlink control channel signaling during a second set of downlink control channel monitoring occasions according to a second monitoring pattern.

A non-transitory computer-readable medium storing code for wireless communications at a UE is described. The code may include instructions executable by a processor to monitor, using a first set of resources, a wireless channel for downlink control channel signaling during a first set of downlink control channel monitoring occasions according to a first monitoring pattern, receive, using a second set of resources, a control message including an instruction to modify the monitoring of the wireless channel using the first set of resources, and monitor, based on the control message, the wireless channel for downlink control channel signaling during a second set of downlink control channel monitoring occasions according to a second monitoring pattern.

Some examples of the method, apparatuses, and non-transitory computer-readable medium described herein may further include operations, features, means, or instructions for identifying, based on the control message, a channel occupancy time during which a base station may have gained access to the wireless channel, where monitoring the wireless channel for downlink control channel signaling during the second set of downlink control channel monitoring occasions includes switching from the first monitoring pattern to the second monitoring pattern for a duration of no more than the channel occupancy time.

Some examples of the method, apparatuses, and non-transitory computer-readable medium described herein may further include operations, features, means, or instructions for reverting, upon expiration of the duration of the channel occupancy time, to the first monitoring pattern.

In some examples of the method, apparatuses, and non-transitory computer-readable medium described herein, monitoring the wireless channel for downlink control channel signaling during the second set of downlink control channel monitoring occasions according to the second monitoring pattern may include operations, features, means, or instructions for refraining from monitoring the wireless channel for the duration of the channel occupancy time.

In some examples of the method, apparatuses, and non-transitory computer-readable medium described herein, the first set of downlink control channel monitoring occasions may have a first periodicity and the second set of downlink control channel monitoring occasions may have a second periodicity that may be greater than the first periodicity.

In some examples of the method, apparatuses, and non-transitory computer-readable medium described herein, the first set of resources includes a first component carrier and the second set of resources includes a second component carrier.

In some examples of the method, apparatuses, and non-transitory computer-readable medium described herein, monitoring the wireless channel for downlink control channel signaling during the second set of downlink control channel monitoring occasions according to the second monitoring pattern further may include operations, features, means, or instructions for refraining from monitoring for downlink control channel signaling using the first component carrier.

In some examples of the method, apparatuses, and non-transitory computer-readable medium described herein, the first component carrier may be a shared component carrier and the second component carrier may be a dedicated component carrier.

In some examples of the method, apparatuses, and non-transitory computer-readable medium described herein, the first component carrier may be a primary component carrier and the second component carrier may be a secondary component carrier.

In some examples of the method, apparatuses, and non-transitory computer-readable medium described herein, the first set of resources includes a first set of one or more beams, and the second set of resources includes a second set of one or more beams.

In some examples of the method, apparatuses, and non-transitory computer-readable medium described herein, monitoring the wireless channel for downlink control channel signaling during the second set of downlink control channel monitoring occasions according to the second monitoring pattern further may include operations, features, means, or instructions for refraining from monitoring for downlink control channel signaling using the first set of one or more beams.

In some examples of the method, apparatuses, and non-transitory computer-readable medium described herein, the first set of resources may be allocated for downlink communications from a base station, and the second set of resources may be allocated for sidelink communications from a second UE.

In some examples of the method, apparatuses, and non-transitory computer-readable medium described herein, receiving the control message further may include operations, features, means, or instructions for receiving the control message, from the second UE, using the second set of resources allocated for sidelink communications.

In some examples of the method, apparatuses, and non-transitory computer-readable medium described herein, monitoring the wireless channel for downlink control channel signaling during the second set of downlink control channel monitoring occasions according to the second monitoring pattern further may include operations, features, means, or instructions for refraining from monitoring for downlink control channel signaling using the first set of resources.

In some examples of the method, apparatuses, and non-transitory computer-readable medium described herein, the first set of resources may be associated with a first radio access technology (RAT) and the second set of resources may be associated with a second RAT.

In some examples of the method, apparatuses, and non-transitory computer-readable medium described herein, monitoring the wireless channel for downlink control channel signaling during the second set of downlink control channel monitoring occasions according to the second monitoring pattern further may include operations, features, means, or instructions for refraining from monitoring for downlink control channel signaling using the first RAT.

In some examples of the method, apparatuses, and non-transitory computer-readable medium described herein, the first RAT supports directional listen-before-talk procedures and the second RAT supports omni-directional listen-before-talk procedures or directional listen-before-talk procedures.

In some examples of the method, apparatuses, and non-transitory computer-readable medium described herein, the first set of resources may include a first set of spatial resources, frequency resources, time resources, or a combination thereof, and the second set of resources may include a second set of spatial resources, frequency resources, time resources, or a combination thereof.

A method of wireless communications at a base station is described. The method may include transmitting, using a first set of resources on a wireless channel for downlink control channel signaling, one or more downlink control channel signals during a first set of one or more downlink control channel monitoring occasions, performing a directional listen-before-talk procedure on one or more beams, determining that the directional listen-before-talk procedure was successful for a first subset of the one or more beams and that the directional listen-before-talk procedure failed for a second subset of the one or more beams, and transmitting, to a first UE using a second set of resources including the second subset of the one or more beams, a control message including an instruction to modify the monitoring of the wireless channel using the first set of resources during a second set of one or more downlink control channel monitoring occasions.

An apparatus for wireless communications at a base station is described. The apparatus may include a first interface, a second interface, and a modem coupled to the first interface and the second interface. In some examples, the modem may be in communication with a transmitter via the first interface, and may output for transmission via the first interface one or more messages, as described below. The modem may also be in communication with a receiver via the second interface, and may obtain messages via the second interface. The modem may be configured to output, over the first interface, using a first set of resources on a wireless channel for downlink control channel signaling, one or more downlink control channel signals during a first set of one or more downlink control channel monitoring occasions, perform a directional listen-before-talk procedure on one or more beams, determine that the directional listen-before-talk procedure was successful for a first subset of the one or more beams and that the directional listen-before-talk procedure failed for a second subset of the one or more beams, and output over the first interface, to a first UE using a second set of resources including the second subset of the one or more beams, a control message including an instruction to modify the monitoring of the wireless channel using the first set of resources during a second set of one or more downlink control channel monitoring occasions.

Another apparatus for wireless communications at a base station is described. The apparatus may include means for transmitting, using a first set of resources on a wireless channel for downlink control channel signaling, one or more downlink control channel signals during a first set of one or more downlink control channel monitoring occasions, performing a directional listen-before-talk procedure on one or more beams, determining that the directional listen-before-talk procedure was successful for a first subset of the one or more beams and that the directional listen-before-talk procedure failed for a second subset of the one or more beams, and transmitting, to a first UE using a second set of resources including the second subset of the one or more beams, a control message including an instruction to modify the monitoring of the wireless channel using the first set of resources during a second set of one or more downlink control channel monitoring occasions.

A non-transitory computer-readable medium storing code for wireless communications at a base station is described. The code may include instructions executable by a processor to transmit, using a first set of resources on a wireless channel for downlink control channel signaling, one or more downlink control channel signals during a first set of one or more downlink control channel monitoring occasions, perform a directional listen-before-talk procedure on one or more beams, determine that the directional listen-before-talk procedure was successful for a first subset of the one or more beams and that the directional listen-before-talk procedure failed for a second subset of the one or more beams, and transmit, to a first UE using a second set of resources including the second subset of the one or more beams, a control message including an instruction to modify the monitoring of the wireless channel using the first set of resources during a second set of one or more downlink control channel monitoring occasions.

Some examples of the method, apparatuses, and non-transitory computer-readable medium described herein may further include operations, features, means, or instructions for identifying a set of UEs including the first UE, the set of UEs being capable of communicating using the second subset of the one or more beams; where the control message includes an indication of the second subset of the one or more beams, and where the instruction to modify the monitoring of the wireless channel using the first set of resources may be based on the identifying the set of UEs capable of communicating using the second subset of the one or more beams.

Some examples of the method, apparatuses, and non-transitory computer-readable medium described herein may further include operations, features, means, or instructions for identifying, based on performing the directional listen-before-talk procedure, a channel occupancy time during which the base station may have gained access to the wireless channel, where the control message includes an instruction to modify the monitoring of the wireless channel for a duration of no more than the channel occupancy time.

In some examples of the method, apparatuses, and non-transitory computer-readable medium described herein, the first set of one or more downlink control channel monitoring occasions may have a first periodicity and the second set of downlink control channel monitoring occasions may have a second periodicity that may be greater than the first periodicity.

In some examples of the method, apparatuses, and non-transitory computer-readable medium described herein, the instruction to modify the monitoring of the wireless channel using the first set of resources includes an instruction to switch from a first monitoring pattern corresponding to the first set of one or more downlink control channel monitoring occasions to a second monitoring pattern corresponding to a second set of downlink control channel monitoring occasions.

In some examples of the method, apparatuses, and non-transitory computer-readable medium described herein, the instruction to modify the monitoring of the wireless channel further includes an instruction to refrain from monitoring the wireless channel for the duration of the channel occupancy time.

In some examples of the method, apparatuses, and non-transitory computer-readable medium described herein, the first set of resources includes a first component carrier and the second set of resources includes a second component carrier.

In some examples of the method, apparatuses, and non-transitory computer-readable medium described herein, the instruction to modify the monitoring of the wireless channel using the first set of resources includes an instruction to refrain from monitoring for downlink control channel signaling using the first component carrier.

In some examples of the method, apparatuses, and non-transitory computer-readable medium described herein, the first component carrier may be a shared component carrier and the second component carrier may be a dedicated component carrier.

In some examples of the method, apparatuses, and non-transitory computer-readable medium described herein, the first component carrier may be a primary component carrier and the second component carrier may be a secondary component carrier.

In some examples of the method, apparatuses, and non-transitory computer-readable medium described herein, the first set of resources includes a first set of one or more beams, and the second set of resources includes a second set of one or more beams.

In some examples of the method, apparatuses, and non-transitory computer-readable medium described herein, the instruction to modify the monitoring of the wireless channel using the first set of resources includes an instruction to refrain from monitoring for downlink control channel signaling using the first set of one or more beams.

In some examples of the method, apparatuses, and non-transitory computer-readable medium described herein, transmitting the control message further may include operations, features, means, or instructions for transmitting, from a first transmit/receive point (TRP) to a second TRP, a command to relay the control message to the first UE using the second set of resources.

In some examples of the method, apparatuses, and non-transitory computer-readable medium described herein, the first set of resources may be allocated for downlink communications from the base station, and the second set of resources may be allocated for sidelink communications between the first UE and a second UE.

In some examples of the method, apparatuses, and non-transitory computer-readable medium described herein, transmitting the control message further may include operations, features, means, or instructions for transmitting a sidelink instruction to a second UE, the instruction including a command to use the second set of resources allocated for sidelink communications to convey the control message to the first UE.

In some examples of the method, apparatuses, and non-transitory computer-readable medium described herein, the instruction to modify the monitoring of the wireless channel using the first set of resources includes an instruction to refrain from monitoring for downlink control channel signaling using the first set of resources.

In some examples of the method, apparatuses, and non-transitory computer-readable medium described herein, the first set of resources may be associated with a first RAT and the second set of resources may be associated with a second RAT.

In some examples of the method, apparatuses, and non-transitory computer-readable medium described herein, the instruction to modify the monitoring of the wireless channel using the first set of resources includes an instruction to refrain from monitoring for downlink control channel signaling using the first RAT.

In some examples of the method, apparatuses, and non-transitory computer-readable medium described herein, the first RAT supports directional listen-before-talk procedures and the second RAT supports omni-directional listen-before-talk procedures or directional listen-before-talk procedures.

In some examples of the method, apparatuses, and non-transitory computer-readable medium described herein, the first set of resources may include a first set of spatial resources, frequency resources, time resources, or a combination thereof, and the second set of resources may include a second set of spatial resources, frequency resources, time resources, or a combination thereof.

DETAILED DESCRIPTION

Figure 1:
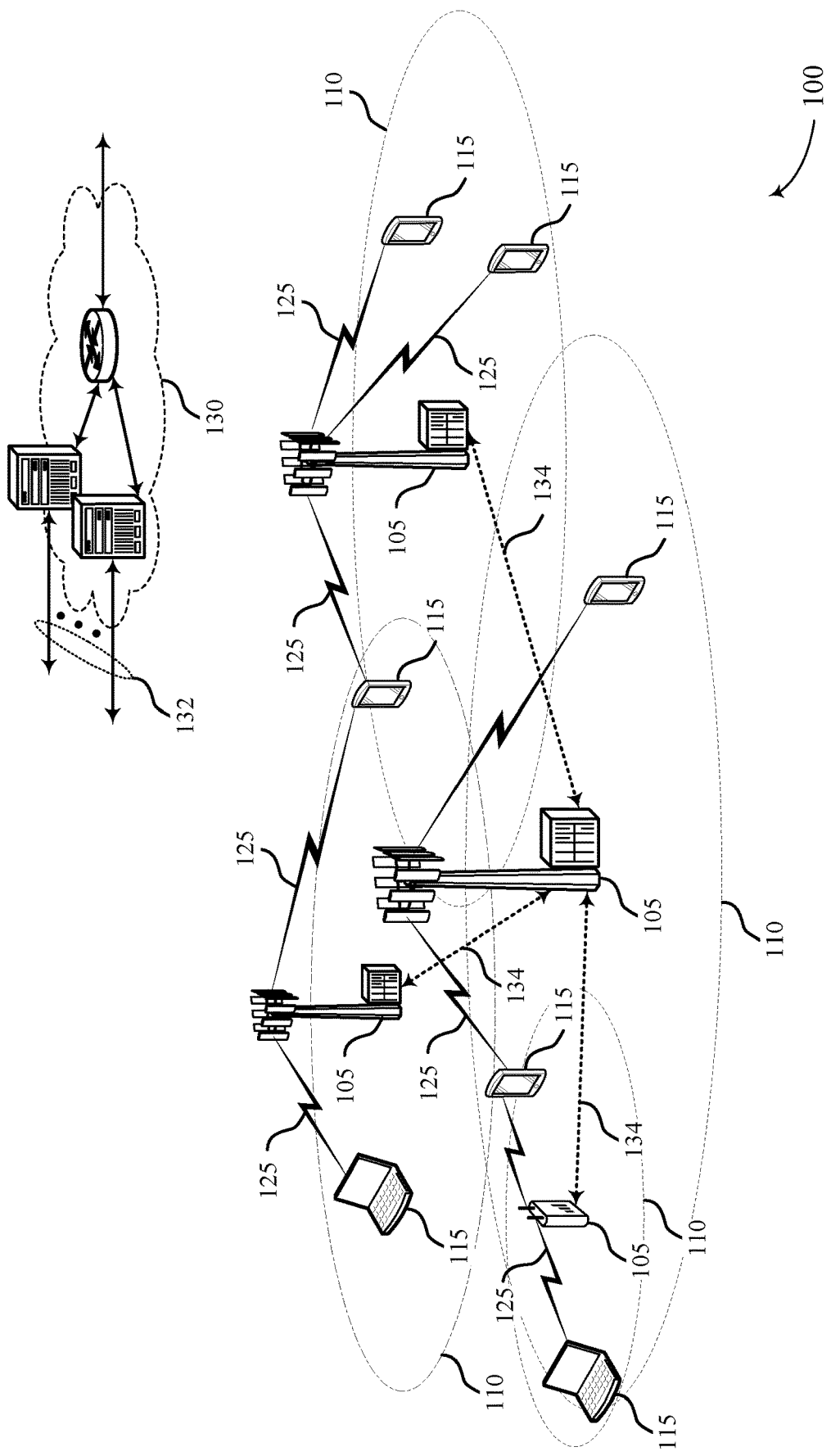
FIG. 1 illustrates an example of a system for wireless communications that supports power saving for downlink control channel monitoring in unlicensed bands in accordance with aspects of the present disclosure.

Some wireless systems support power savings for downlink control channel monitoring in unlicensed bands. A base station may contend for access to an unlicensed wireless channel (e.g., may perform a listen-before-talk (LBT) procedure). If an LBT procedure is successful, then the base station may initiate a channel occupancy time (COT) and may communicate with one or more user equipment's (UEs) using the unlicensed wireless channel. In some examples, the base station may be able to flexibly initiate a channel occupancy time (COT) upon gaining access to the wireless channel, without being limited to start times at slot boundaries. To support flexible COT start times, a UE may monitor for downlink control channel signaling during one or more monitoring occasions on the unlicensed wireless channel using monitoring occasions having a small periodicity (e.g., mini-slot level monitoring).

Upon gaining access to the wireless channel, the base station may communicate with one or more UEs during the COT. However, during the COT, some UEs (e.g., eMBB UEs) may not benefit from frequent or continuous physical downlink control channel (PDCCH) monitoring. In such examples, if a UE continues to perform frequent monitoring for PDCCH signaling (e.g., mini-slot level monitoring) during the COT, the UE may experience excessive and unnecessary power consumption for a monitoring UE. Thus, a base station may switch the UE from a first monitoring pattern with a short periodicity (e.g., mini-slot level monitoring) to a second monitoring pattern with a large periodicity (e.g., slot level monitoring). Thus, the UE may save power by monitoring for downlink signaling less often during the COT.

In some examples (e.g., in an unlicensed high band), a base station may perform one or more directional LBT procedures to gain access to an unlicensed wireless channel. In some examples, the base station may gain access to the wireless channel for some beams (e.g., allowed beams) and may not gain access to the wireless channel for other beams (e.g., non-allowed beams). In such examples, the base station may send an indication to switch from the first monitoring pattern to the second monitoring pattern to a UE which can receive downlink control messages from the base station on the allowed beams. But the base station may not be able to send a similar indication to switch from the first monitoring pattern to the second monitoring pattern using the unlicensed wireless channel to one or more UEs which cannot receive downlink control messages on the allowed beams, and are located so as to be able to receive downlink communications on the disallowed beams. Thus, UEs that are unable to receive downlink signaling on the allowed beams may continue to inefficiently monitor for downlink control message according to the first monitoring pattern (e.g., with a higher frequency), resulting in unnecessary power expenditure.

In some examples, a base station may gain access to the wireless channel and may communicate with one or more UEs using the allowed beams on a first set of resources (e.g., time resources, frequency resources, spatial resources, or the like). The base station may also transmit a control message to UEs that are unable to communicate using the allowed beams using a second set of resources (e.g., time resources, frequency resources, spatial resources, or the like). The control message may include including an instruction to modify control channel monitoring (e.g., switch from the first monitoring pattern to a second monitoring pattern or to skip monitoring entirely) for the remainder of a COT duration. In some examples, the respective first and second sets of resources may include first and second carriers (e.g., a licensed carrier and an unlicensed carrier, a primary carrier and a secondary carrier, or the like). In some examples, the respective first and second sets of resources may include first and second beams transmitted by respective first and second transmit/receive points (TRPs). In some examples, the respective first and second sets of resources may include frequency resources reserved for first and second radio access technologies (RATs). In some examples, the respective first and second sets of resources may include frequency resources reserved for downlink and sidelink communications (e.g., the base station may instruct a UE that can receive communications on the allowed beams to send a sidelink transmission including the control message to one or more UEs that cannot receive communications on the allowed beams). Upon receiving the control message using the second set of resources, a UE may switch from a first monitoring pattern (e.g., mini-slot level monitoring) to a second monitoring pattern (e.g., slot level monitoring, or skipping monitoring) for the remainder of the COT.

Particular aspects of the subject matter described herein may be implemented to realize one or more advantages. The described techniques may support improvements in system efficiency and power savings such that a device may avoid inefficiently continuing to monitor for downlink signaling on time, spatial, or frequency resources over which a base station has not successfully contended for access. Thus, as a result of the procedures described herein, a UE may be able to switch from a first monitoring periodicity to a second (power saving) monitoring periodicity. Doing so may result in decreased power expenditures by the UE, increased battery life, increased system efficiency, and improved user experience.

Aspects of the disclosure are initially described in the context of a wireless communications system. Aspects of the disclosure are further illustrated by and described with reference to timelines and process flows. Aspects of the disclosure are further illustrated by and described with reference to apparatus diagrams, system diagrams, and flowcharts that relate to power saving for downlink control channel monitoring in unlicensed bands.

FIG. 1 illustrates an example of a wireless communications system 100 that supports power saving for downlink control channel monitoring in unlicensed bands in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a base station 105 may transmit downlink control channel messages during one or more monitoring occasions using a first set of resources (e.g., spatial or frequency or time resources). The base station 105 may perform a directional LBT procedure on one or more beams, and may determine that the directional LBT procedure was successful for a set of allowed beams and unsuccessful for a set of non-allowed beams. The base station 105 may transmit a control message to a UE 115 that cannot receive downlink control signaling over the allowed beams. The control message may include instructions to modify monitoring of a wireless channel using the first set of resources (e.g., using one or more allowed beams). The base station 105 may send the control message over a second set of resources. A UE 115 may monitor, using the first set of resources, for downlink control channel signaling during monitoring occasions according to a first monitoring pattern. The UE 115 may receive, using the second set of resources, the control message, and may monitor the wireless channel according a second monitoring pattern based on the received control message.

Receiving the control message including the instructions on the second set of resources may allow a UE 115 to monitor the wireless channel according to a second monitoring pattern (e.g., skipping PDCCH monitoring for the remainder of the COT or monitoring less often during the remainder of the COT). An advantage of the second monitoring pattern may include increased power savings at the UE, increased battery life, increased system efficiency, and improved user experience.

The UE 115 may identify the duration of the COT (e.g., based on the control message) and may switch to the second monitoring pattern for the remainder of the COT, which may result in decreased power expenditures and improved power savings at the UE.

The first and second sets of resources may include, for example, first and second carriers, first and second RATs, first and second beams, first and second sets of resources associated with first and second TRPs, and resources associated with downlink and sidelink communications, respectively. An advantage of receiving the control message via the second set of resources may include being able to receive an otherwise un-receivable instruction to switch from the first monitoring pattern to the second monitoring pattern, which may allow the UE to switch to a lower-power monitoring pattern more quickly. Switching to the second monitoring pattern may result in increased power savings at the UE, increased battery life, increased system efficiency, and improved user experience.

Figure 2:
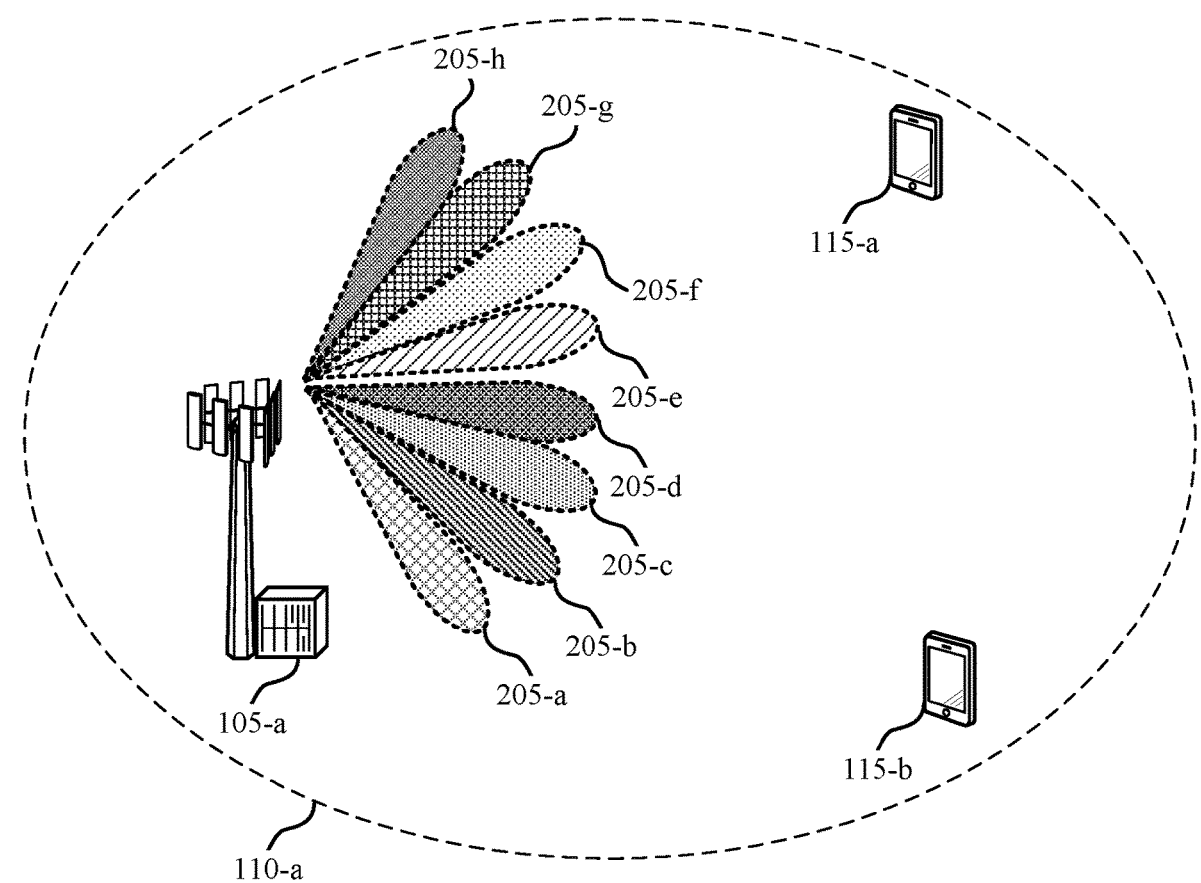
FIG. 2 illustrates an example of a wireless communications system that supports power saving for downlink control channel monitoring in unlicensed bands in accordance with aspects of the present disclosure.

FIG. 2 illustrates an example of a wireless communications system 200 that supports power saving for downlink control channel monitoring in unlicensed bands in accordance with aspects of the present disclosure. In some examples, wireless communications system 200 may implement aspects of wireless communications system 100.

In some examples of a wireless communications system, a base station 105-a may communicate with one or more UEs 115 (e.g., UE 115-a and UE 115-b) using an unlicensed band (e.g., an unlicensed high band, such as a millimeter wave band). Base station 105-a may contend for access to an unlicensed wireless channel by performing one or more LBT procedures (e.g., directional LBT procedures). Upon gaining access to the wireless channel, base station 105-a may start a COT. To support flexible starting times for the COT (e.g., without being limited to slot boundaries), UEs 115 may monitor for downlink control signaling (e.g., PDCCH signaling) periodically (e.g., mini-slot level monitoring).

In some examples, a UE 115 (e.g., UE 115-a or UE 115-b or both) may be eMBB UEs, and may not have to continue to perform mini-slot level monitoring within a COT. In such examples, base station 105-a may switch UEs 115 from mini-slot level monitoring to a second monitoring pattern (e.g., slot level monitoring or no monitoring) for the duration of the COT. Switching from mini-slot level monitoring to slot level monitoring during the COT may result in power saving at the UE 115. Upon expiration of the COT, the UE 115 may switch back to mini-slot level monitoring to detect a flexible starting point for a next COT. Switching from mini-slot level monitoring to slot-level monitoring is described in greater detail with respect to FIG. 3.

In some examples, base station 105-a may support directional LBT procedures. Directional LBT procedures may allow base station 105-a to gain medium access with better probability (e.g., in comparison to omni-sensing or omni-directional LBT procedures). That is, omni-sensing procedures may include base station 105-a performing successful LBT procedures in all directions (e.g., on each beam 205) to consider the LBT procedure successful and gain access to the medium. In such examples, base station 105-a may transmit on any beam 205 in any direction within a resulting COT upon performing a successful LBT on all beams 205. Directional sensing may allow base station 105-a to transmit on any beam 205 (e.g., in any direction) on which an LBT procedure is successful, regardless of whether LBT procedures are successful on other beams. However, base station 105-a may not be able to transmit on any other beam 205 (e.g., in any other direction) on which an LBT procedure is not successful or channel sensing has not been performed.

For instance, base station 105-a may perform directional LBT procedures for each of beam 205-a, beam 205-b, beam 205-c, beam 205-d, beam 205-e, beam 205-f, beam 205-g, and beam 205-h. The LBT procedures may be successful for a set of allowed beams 205 (e.g., beam 205-e, beam 205-f, beam 205-g, and beam 205-h). But, the LBT procedures may be unsuccessful for a set of non-allowed beams 205 (e.g., beam 205-a, beam 205-b, beam 205-c, and beam 205-d). In such examples, base station 105-a may be able to communicate during a corresponding COT using the unlicensed wireless channel, with any UE 115 that can receive downlink transmissions on one or more of the allowed beams 205 (e.g., UE 115-a). However, UE 115-b may not be able to receive downlink transmissions on the allowed beams 205, and may instead be able to communicate with base station 105-a using the non-allowed beams 205. In such examples, base station 105-a may send a control message over one or more of the allowed beams 205, indicating that UE 115-a should switch from a first monitoring pattern to a second monitoring pattern for the remainder of a COT. UE 115-a may thus benefit from an indication (e.g., a PDCCH switching indication or PDCCH skipping indication) to switch to less frequent PDCCH monitoring. However, UE 115-b may not be able to detect the COT start or receive the control message over the allowed beams 205, and base station 105-a may not be able to transmit the control message on the non-allowed beams 205 (e.g., as a result of failed directional LBT procedures on the non-allowed beams). In such examples, UE 115-b may unnecessarily expend power on more frequent PDCCH monitoring without being able to be scheduled during the COT. That is, UE 115-b may continue to monitor for signaling according to the first monitoring pattern (e.g., mini-slot level monitoring), resulting in increased power consumption and no opportunity to be scheduled during the COT.

As described in greater detail with respect to FIGS. 4-8, base station 105-a may transmit a control message including an indication to switch from the first monitoring pattern to the second monitoring pattern during the COT over a first set of resources (e.g., time resources, spatial resources, frequency resources, or the like) to UE 115-a over the using allowed beams 205, and may send a control message including an indication to switch from the first monitoring pattern to the second monitoring pattern to UE 115-b during the COT over a second set of resources (e.g., time resources, spatial resources, frequency resources, or the like). UE 115-b may receive the control message over the second set of resources, and may switch from the first monitoring pattern to the second monitoring pattern for the remainder of the COT.

Figure 3:
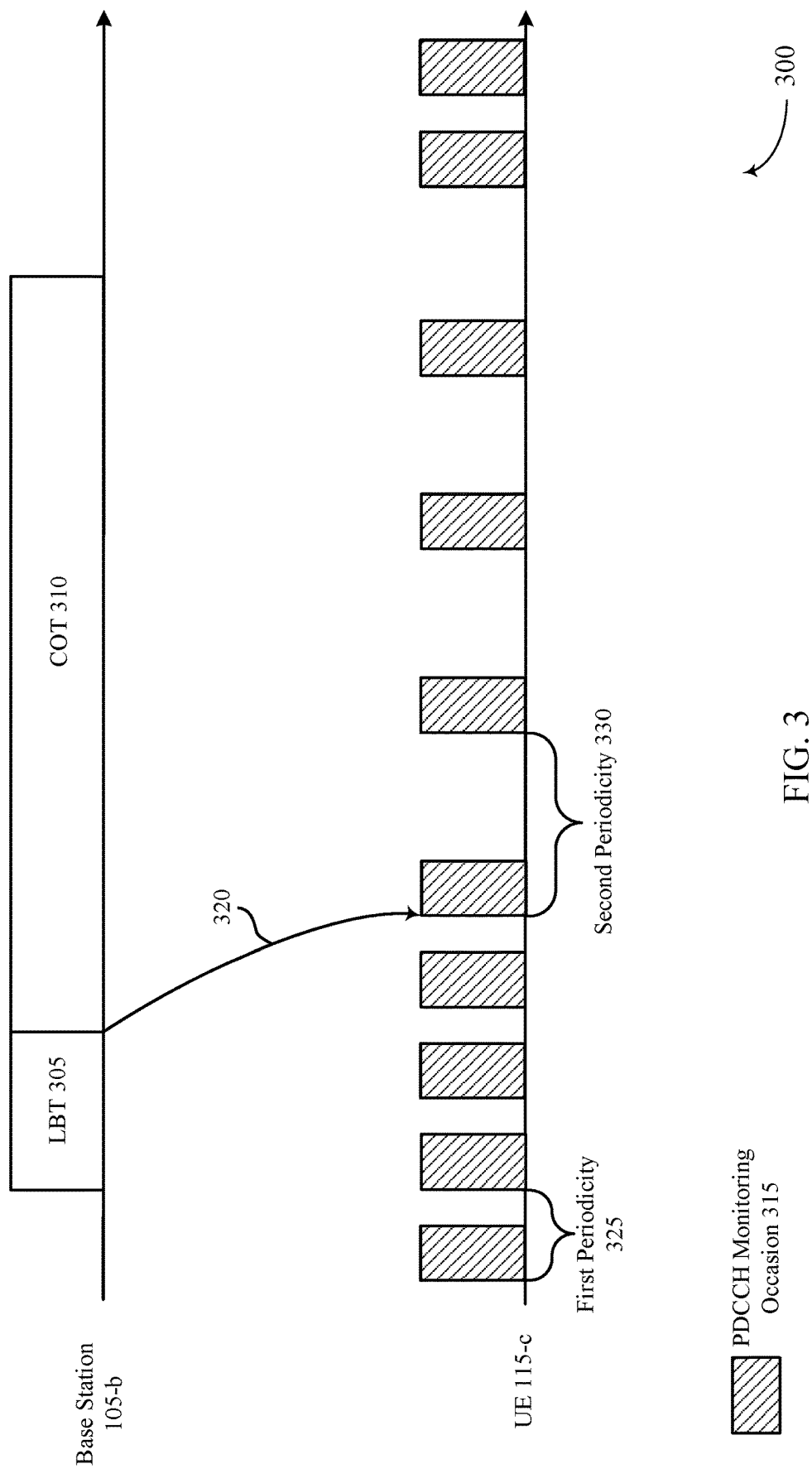
FIG. 3 illustrates an example of a timeline that supports power saving for downlink control channel monitoring in unlicensed bands in accordance with aspects of the present disclosure.

FIG. 3 illustrates an example of a timeline 300 that supports power saving for downlink control channel monitoring in unlicensed bands in accordance with aspects of the present disclosure. In some examples, timeline 300 may implement aspects of wireless communications system 100 and wireless communications system 200.

In some examples, base station 105-b may gain access to an unlicensed wireless channel, and may send an instruction to switch from a first monitoring pattern to a second monitoring pattern to a UE 115-c. Base station 105-a may contend for access to an unlicensed wireless channel by performing one or more directional LBT procedures 305. Upon gaining access to the wireless channel, base station 105-b may start a COT 310. To support flexible starting times for the COT 310 (e.g., without being limited to slot boundaries), UE 115-c may monitor for PDCCH signaling during a first set of PDCCH monitoring occasions 315 having a first periodicity 325 (e.g., mini-slot level monitoring).

In some examples, base station 105-b may switch UE 115-a from a first monitoring pattern having first periodicity 325 to a second monitoring pattern having a second periodicity 330. Base station 105-a may send a control message 320 to UE 115-c. The control message 320 may trigger a switch from the first monitoring pattern to the second monitoring pattern. The control message 320 may be included in a group common PDCCH (e.g., channel occupancy time system information (COT-SI)) or a UE-specific PDCCH.

Upon receiving the control message 320, UE 115-c may switch from a first monitoring pattern having first periodicity 325 (e.g., mini-slot level monitoring) to a second monitoring pattern having second periodicity 330 (e.g., slot level monitoring). UE 115-c may monitor for PDCCH signaling according to the second monitoring pattern for the remainder of COT 310. Upon expiration of COT 310, UE 115-c may switch back to the first monitoring pattern with the first periodicity 325. In some examples, control message 320 may include an indication of the duration or end-point of COT 310. In some examples, base station 105-b may send, upon expiration of COT 310, an indication that COT 310 has expired. UE 115-c may continue to monitor for PDCCH signaling according to the first monitoring pattern until base station 105-b performs another successful LBT and starts another COT.

In some examples, as described in greater detail with respect to FIG. 2, base station 105-b may perform directional LBT procedures, and may gain access to the unlicensed wireless channel only on a set of one or more allowed beams. In such examples, UEs 115 that cannot receive control channel signaling on the allowed beams (e.g., as a result of their geographic location with respect to base station 105-b) may not successfully receive control message 320. In such examples, base station 105-b may send another control message to those UEs 115 using another set of resources (e.g., spatial resources, time resources, frequency resources, or a combination thereof), as described in greater detail with respect to FIGS. 4-8.

Figure 4:
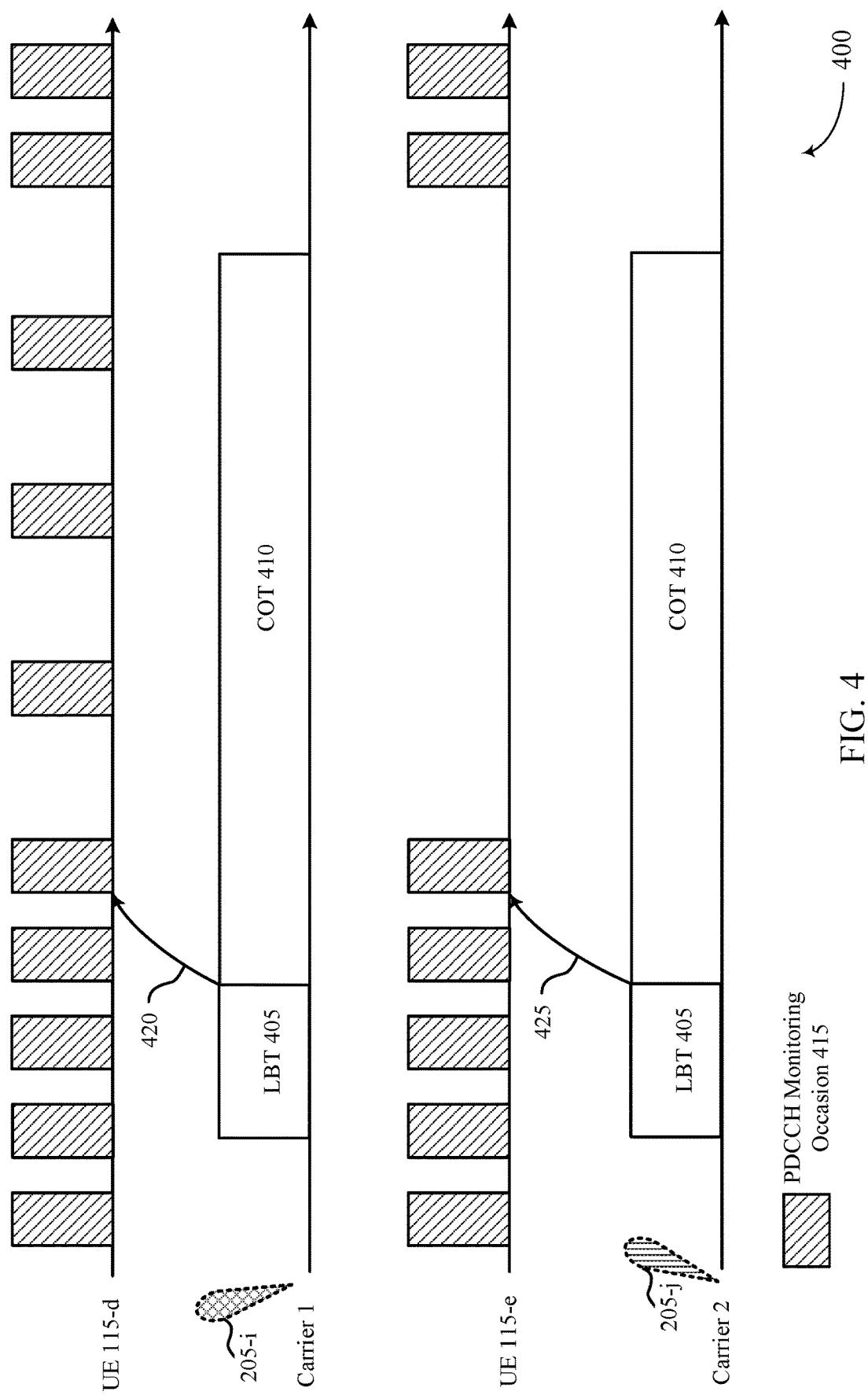
FIG. 4 illustrates an example of a timeline that supports power saving for downlink control channel monitoring in unlicensed bands in accordance with aspects of the present disclosure.

FIG. 4 illustrates an example of a timeline 400 that supports power saving for downlink control channel monitoring in unlicensed bands in accordance with aspects of the present disclosure. In some examples, timeline 400 may implement aspects of wireless communications system 100 and wireless communications system 200.

In some examples, a base station 105 may gain access to an unlicensed wireless channel, and may send an instruction to switch from a first monitoring pattern to a second monitoring pattern to a UE 115-d over a first carrier, and an instruction to switch from a first monitoring pattern to a second monitoring pattern (e.g., to skip monitoring) to a UE 115-e over a second carrier. That is, during a transmission opportunity (e.g., COT 410), if a base station 105 cannot send a PDCCH switching indication in a certain direction due to directional LBT procedures, the PDCCH switching indication may be sent on another carrier to signal a UE 115 regarding PDCCH monitoring behavior on the first carrier.

In some examples, the base station 105 may contend for access to an unlicensed wireless channel by performing one or more directional LBT procedures 405. The directional LBT procedures 405 may be successful on a set of one or more allowed beams (e.g., beam 205-i), and may be unsuccessful on a set of one or more non-allowed beams (e.g., beam 205-j). Upon gaining access to the wireless channel for the set of allowed beams, the base station 105 may start a COT 410. To support flexible start times of the COT (e.g., without being limited to slot boundaries), UE 115-d and UE 115-e may monitor for PDCCH signaling during a first set of PDCCH monitoring occasions 415 according to a first monitoring pattern (e.g., mini-slot level monitoring).

In some examples, the base station 105 may switch UE 115-d from a first monitoring pattern having first periodicity to a second monitoring pattern having a second periodicity. The base station 105 may send a control message 420 to UE 115-d over an allowed beam 205-i on carrier 1 (e.g., an unlicensed wireless component carrier). The control message 420 may trigger a switch from the first monitoring pattern to the second monitoring pattern. The control message 420 may be included in a group common PDCCH (e.g., channel occupancy time system information (COT-SI)) or a UE-specific PDCCH, or the like. UE 115-d may receive the control message 420, and may switch from a first monitoring pattern to a second monitoring pattern for the remainder of COT 410. However, UE 115-e may not be able to receive control message 420 over allowed beam 205-i on carrier 1.

To improve power savings at UE 115-e, the base station 105 may send a control message 425 to UE 115-e over a beam 205-j on carrier 2. The control message 425 may be included in a group common PDCCH (e.g., channel occupancy time system information (COT-SI)) or a UE-specific PDCCH, or the like. In some examples, carrier 1 may be an unlicensed carrier and carrier 2 may be a licensed carrier. In some examples, carrier 1 may be a primary carrier and carrier 2 may be a secondary carrier, or carrier 2 may be a primary carrier and carrier 1 may be a secondary carrier. In some examples, both carrier 1 and carrier 2 may be unlicensed carriers, and the base station 105 may determine that carrier 2 is more reliable. In some examples, the base station 105 may perform directional LBT procedures on carrier 1 and on carrier 2. In such examples, the base station 105 may gain access to beam 205-i on carrier 1, and may gain or have continuous access to beam 205-j on carrier 2. In any of the above recited examples, or in any combination thereof, the base station 105 may determine that a directional transmission on beam 205-j on carrier 2 will be receivable by UE 115-e. Thus, base station 105 may rely on carrier 2 to send the PDCCH switching indication for carrier 1 to cover UEs 115 whose beams are not in the allowed beam set on carrier 1 during the transmission opportunity (e.g., COT 410). Additionally, base station 105 may use carrier 2 or other carriers to further signal UEs 115 to skip the PDCCH monitoring on the entire transmission opportunity on carrier 1 if their beams are not within the allowed beam set on carrier 1.

UE 115-e may receive control message 425 over carrier 2. In some examples, the control message 425 may include an instruction to switch from a first monitoring pattern to a second monitoring pattern. The second monitoring pattern may include monitoring one or more PDCCH monitoring occasions 415 at a greater periodicity than the first periodicity (e.g., slot level monitoring). In some examples, the second monitoring pattern may include skipping PDCCH monitoring altogether for the remainder of COT 410. In such examples, UE 115-e may refrain from monitoring for PDCCH signaling until the expiration of COT 410. Upon expiration of COT 410, UE 115-e may revert to monitoring for PDCCH signaling according to the first monitoring pattern. UE 115-e may determine the end of COT 410 based on an indication included in one or more control message (e.g., control message 425). In some examples, UE 115-e may receive a separate control message at the end of COT 410 indicating the termination of COT 410.

Figure 5:
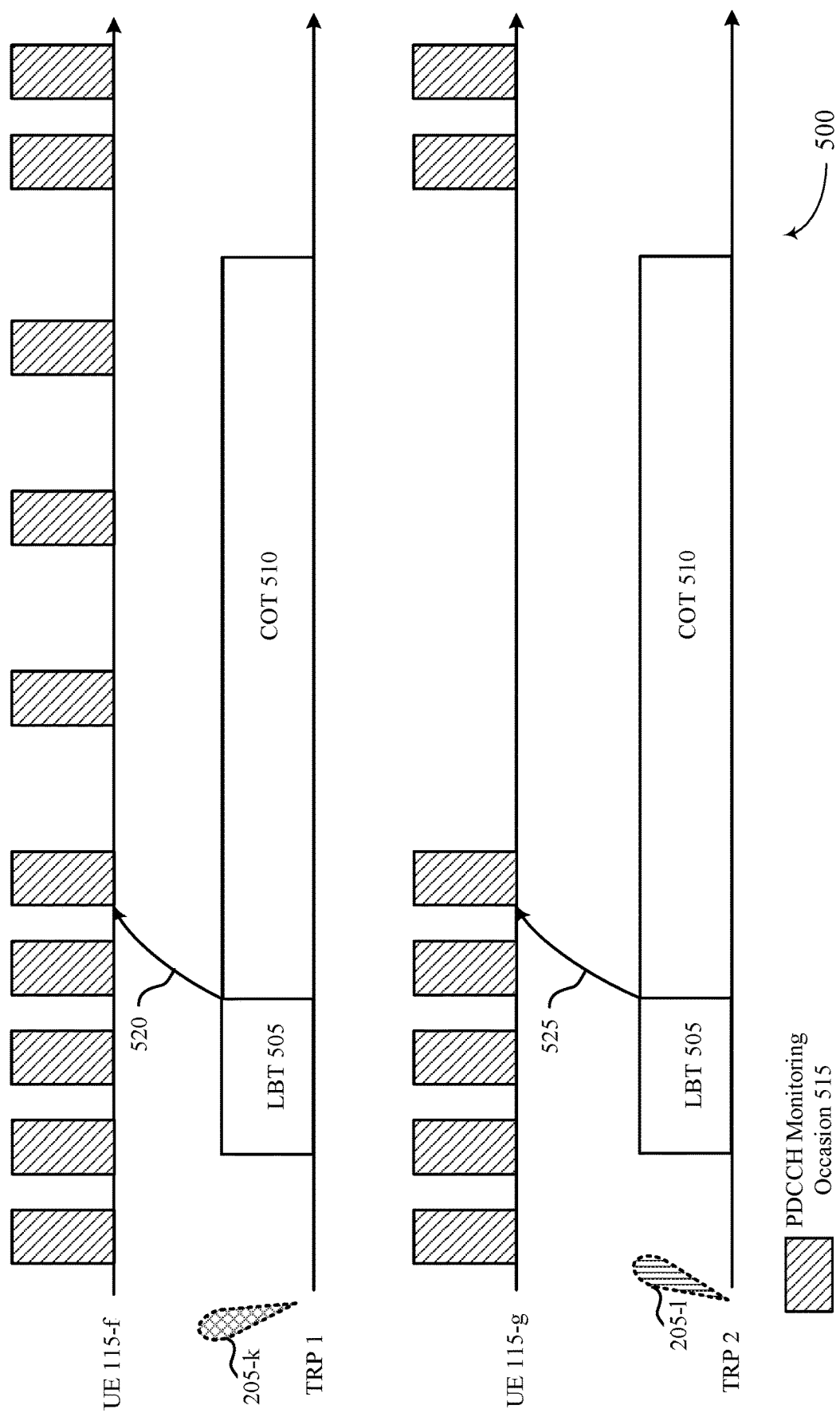
FIG. 5 illustrates an example of a timeline that supports power saving for downlink control channel monitoring in unlicensed bands in accordance with aspects of the present disclosure.

FIG. 5 illustrates an example of a timeline 500 that supports power saving for downlink control channel monitoring in unlicensed bands in accordance with aspects of the present disclosure. In some examples, timeline 500 may implement aspects of wireless communications system 100 and wireless communications system 200.

In some examples, a base station 105 may gain access to an unlicensed wireless channel, and may send an instruction to switch from a first monitoring pattern to a second monitoring pattern to a UE 115-*f* using a first TRP, and an instruction for UE 115-*g* to switch from a first monitoring pattern to a second monitoring pattern (e.g., to skip monitoring) using a second TRP. That is, during a transmission opportunity (e.g., COT 510), if a base station 105 cannot send a PDCCH switching indication from a first TRP in a certain direction due to directional LBT procedures, the PDCCH switching indication may be sent by another TRP to signal a UE 115 regarding PDCCH monitoring behavior on the first carrier.

In some examples, the base station 105 may contend for access to an unlicensed wireless channel by performing one or more directional LBT procedures 505. The directional LBT procedures 505 may be successful on a set of one or more allowed beams (e.g., including beam 205-*k*), and may be unsuccessful on a set of one or more non-allowed beams (e.g., including beam 205-*l*). Upon gaining access to the wireless channel for the set of allowed beams, the base station 105 may start a COT 510. To support flexible start times of the COT (e.g., without being limited to slot boundaries), UE 115-*f* and UE 115-*g* may monitor for PDCCH signaling during a first set of PDCCH monitoring occasions 515 according to a first monitoring pattern (e.g., mini-slot level monitoring).

In some examples, the base station 105 may switch UE 115-*f* from a first monitoring pattern having first periodicity to a second monitoring pattern having a second periodicity. The base station 105 may send a control message 520 to UE 115-*d* over an allowed beam 205-*k* from TRP 1. The control message 520 may trigger a switch from the first monitoring pattern to the second monitoring pattern. The control message 520 may be included in a group common PDCCH (e.g., channel occupancy time system information (COT-SI)) or a UE-specific PDCCH, or the like. UE 115-*f* may receive the control message 520, and may switch from a first monitoring pattern to a second monitoring pattern for the remainder of COT 510. However, UE 115-*g* may not be able to receive control message 520 over allowed beam 205-*k* sent by TRP 1.

To improve power savings at UE 115-*g*, the base station 105 may send a control message 525 to UE 115-*g* over a beam 205-*g* from TRP 2. That is, for one transmission opportunity (e.g., COT 510) when TRP 1 cannot send a PDCCH switching indication on a certain direction (e.g., beam 205-*l*) due to a failed directional LBT procedure, the PDCCH switching indication may be sent on another TRP to signal UE 115-*g* regarding a change in PDCCH monitoring behavior on TRP 1. For instance, the base station 105 may send, via TRP 2, the PDCCH switching indication for TRP 1 to cover all UEs 115 (e.g., including UE 115-*g*) whose beams are not in the allowed beam set on TRP 1 in the transmission opportunity. TRP 1 and TRP 2 may be co-located, quasi-co-located, or may be located in different physical places (e.g., on different base stations 105). TRP 1 and TRP 2 may communicate with each other and coordinate the transmission of control message 520 and control message 525 via backhaul signaling. The control message 525 may be included in a group common PDCCH (e.g., channel occupancy time system information (COT-SI)) or a UE-specific PDCCH, or the like.

In some examples, TRP 1, TRP 2, and one or more additional TRPs may further signal UEs 115 to skip PDCCH monitoring on the entire COT 510 on TRP 1 if their beams are not within the allowed beam set on TRP 1. For instance, with two-DCI based multi-TRP operations, a UE 115 may be configured with up to five control resource sets (CORE-SETs), and the UE 115 may monitor for PDCCH from multiple TRPs on the up to five CORESETs. With x TRP PDCCH monitoring indications, a UE 115 may monitor CORESETs corresponding to TRP 2 and skip other CORESETs corresponding to TRP 1 during COT 510. In some examples, TRP 1 may be a primary TRP and TRP 2 may be a secondary TRP. In some examples, TRP 2 may be a primary TRP and TRP 1 may be a secondary TRP.

UE 115-*g* may receive control message 525 from TRP 2. In some examples, the control message 525 may include an instruction to switch from a first monitoring pattern to a second monitoring pattern. The second monitoring pattern may include monitoring one or more PDCCH monitoring occasions 515 at a greater periodicity than the first periodicity (e.g., slot level monitoring). In some examples, the second monitoring pattern may include skipping PDCCH monitoring altogether for the remainder of COT 510. In such examples, UE 115-*g* may refrain from monitoring for PDCCH signaling until the expiration of COT 510. Upon expiration of COT 510, UE 115-*g* may revert to monitoring for PDCCH signaling according to the first monitoring pattern. UE 115-*g* may determine the end of COT 510 based on an indication included in one or more control message (e.g., control message 525). In some examples, UE 115-*g* may receive a separate control message at the end of COT 510 indicating the termination of COT 510.

Figure 6:
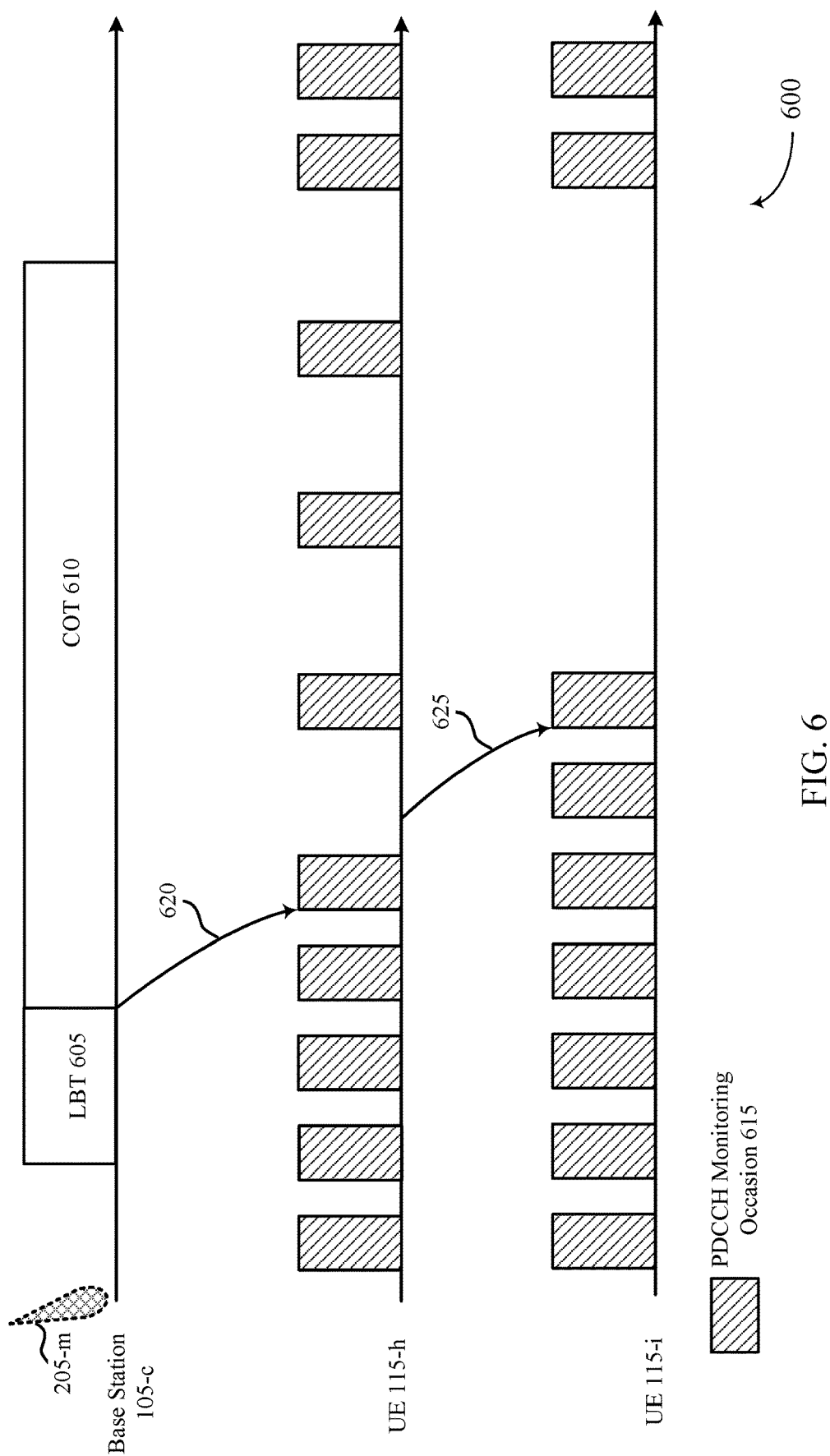
FIG. 6 illustrates an example of a timeline that supports power saving for downlink control channel monitoring in unlicensed bands in accordance with aspects of the present disclosure.

FIG. 6 illustrates an example of a timeline 600 that supports power saving for downlink control channel monitoring in unlicensed bands in accordance with aspects of the present disclosure. In some examples, timeline 600 may implement aspects of wireless communications system 100 and wireless communications system 200.

In some examples, base station 105-*c* may gain access to an unlicensed wireless channel, and may send an instruction to switch from a first monitoring pattern to a second monitoring pattern to a UE 115-*h* over an allowed beam 205-*m*, and an instruction for UE 115-*h* to convey the control message to UE 115-*i* using resource allocated for sidelink transmissions. That is, during a transmission opportunity (e.g., COT 610), when base station 105-*c* cannot send a PDCCH switching indication in a particular direction (e.g., on a non-allowed beam receivable by UE 115-*i*), then the transmission opportunity information may be conveyed from another UE 115 to UE 115-I using sidelink transmissions.

In some examples, base station 105-*c* may contend for access to an unlicensed wireless channel by performing one or more directional LBT procedures 605. The directional LBT procedures 605 may be successful on a set of one or more allowed beams (e.g., including beam 205-*m*), and may be unsuccessful on a set of one or more non-allowed beams. Upon gaining access to the wireless channel for the set of allowed beams, base station 105-*c* may start a COT 610. To support flexible start times of the COT 610 (e.g., without being limited to slot boundaries), UE 115-*h* and UE 115-*i* may monitor for PDCCH signaling during a first set of PDCCH monitoring occasions 615 according to a first monitoring pattern (e.g., mini-slot level monitoring).

In some examples, base station 105-*c* may switch UE 115-*h* from a first monitoring pattern having first periodicity to a second monitoring pattern having a second periodicity. Base station 105-*c* may send a control message 620 to UE 115-*h* over an allowed beam 205-*m*. The control message 620 may trigger a switch from the first monitoring pattern to the second monitoring pattern. The control message may be included in a group common PDCCH (e.g., channel occupancy time system information (COT-SI)) or a UE-specific PDCCH, or the like. UE 115-*f* may receive the control message 620, and may switch from a first monitoring pattern to a second monitoring pattern for the remainder of COT 610. However, UE 115-g may not be able to receive control message 620 over allowed beam 205-m.

To improve power savings at UE 115-i, base station 105-c may send an instruction (e.g., included in control message 620) to UE 115-h over beam 205-m. For instance, base station 105-c may send (e.g., over a first cell) control message 620 to UE 115-h over beam 205-m. Base station 105-c may include an instruction to convey the control message (e.g., control message 625) to UE 115-i via a sidelink transmission. UE 115-h may switch from the first monitoring pattern to the second monitoring pattern, and may then transmit control message 625 (e.g., relaying control message 620 including the instruction to switch from the first monitoring pattern to the second monitoring pattern) to UE 115-i using resources allocated for sidelink communications.

UE 115-i may receive control message 625 from UE 115-h. In some examples, the control message may include an instruction to switch from a first monitoring pattern to a second monitoring pattern. The second monitoring pattern may include monitoring one or more PDCCH monitoring occasions 615 at a greater periodicity than the first periodicity (e.g., slot level monitoring). In some examples, the second monitoring pattern may include skipping PDCCH monitoring altogether for the remainder of COT 610. In such examples, UE 115-i may refrain from monitoring for PDCCH signaling until the expiration of COT 610. Upon expiration of COT 610, UE 115-i may revert to monitoring for PDCCH signaling according to the first monitoring pattern. UE 115-i may determine the end of COT 610 based on an indication included in one or more control message (e.g., control message 625). In some examples, UE 115-i may receive a separate control message at the end of COT 610 from UE 115-h indicating the termination of COT 610.

Figure 7:
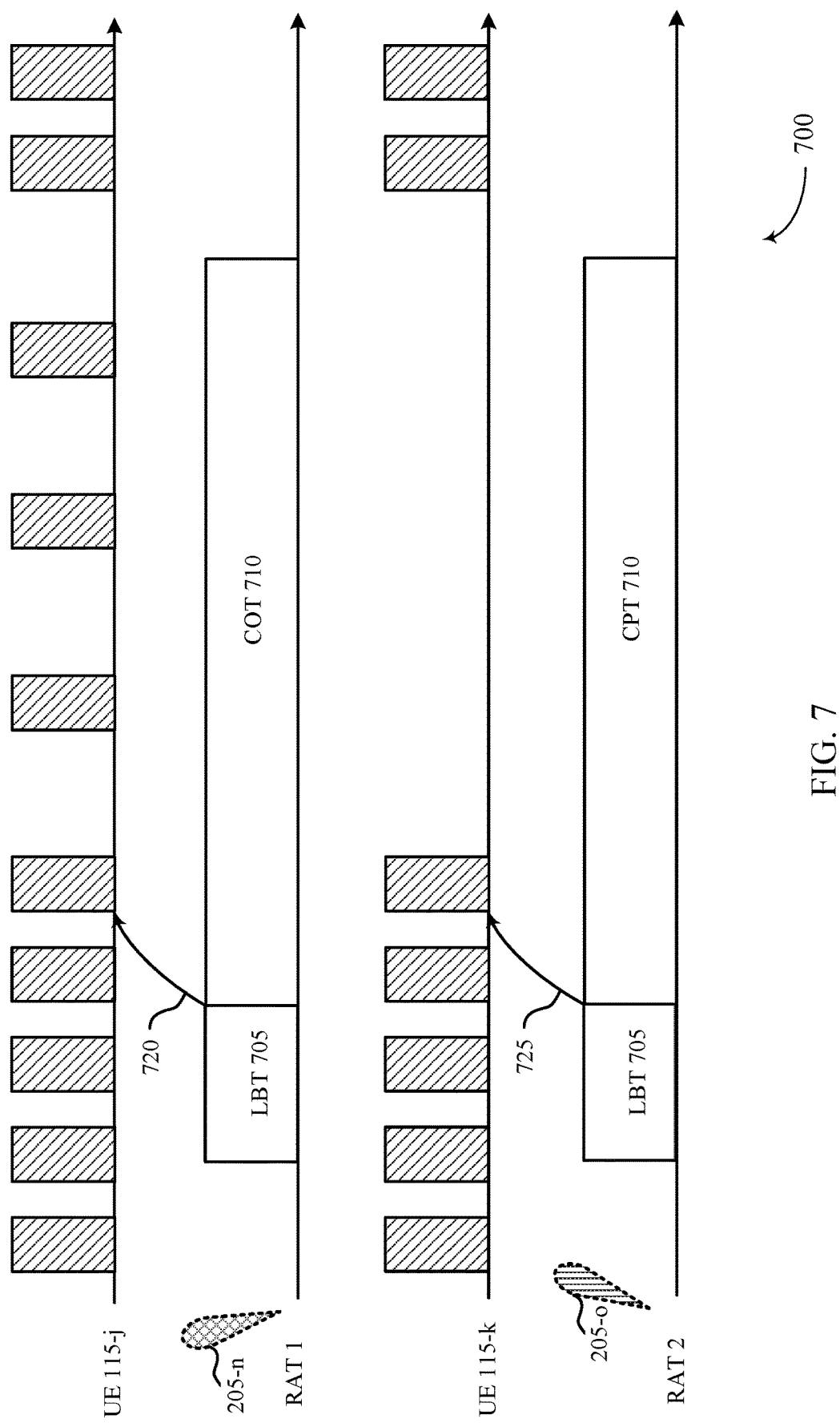
FIG. 7 illustrates an example of a timeline that supports power saving for downlink control channel monitoring in unlicensed bands in accordance with aspects of the present disclosure.

FIG. 7 illustrates an example of a timeline 700 that supports power saving for downlink control channel monitoring in unlicensed bands in accordance with aspects of the present disclosure. In some examples, timeline 700 may implement aspects of wireless communications system 100 and wireless communications system 200.

In some examples, a base station 105 may gain access to an unlicensed wireless channel, and may send an instruction to switch from a first monitoring pattern to a second monitoring pattern to a UE 115-j over a first RAT, and an instruction to switch from a first monitoring pattern to a second monitoring pattern (e.g., to skip monitoring) to UE 115-k over a second RAT. That is, during a transmission opportunity (e.g., COT 710), if a base station 105 cannot send a PDCCH switching indication in a certain direction due to directional LBT procedures, the PDCCH switching indication may be sent on another RAT to signal a UE 115 regarding PDCCH monitoring behavior on the first RAT. For instance, a UE 115-k may be capable of receiving two RATs simultaneously (e.g., a UE 115 may be able to simultaneously receive two or more of LTE communications, Bluetooth communications, 5G communications, etc.). RAT 1 may support directional LBT procedures, while RAT 2 may only support omni-directional LBT procedures. In some example, RAT 1 and RAT 2 may be located in the same band, or different unlicensed bands. IN some examples, RAT 1 may support directional LBT procedures and RAT 2 may support omni-directional LBT procedures and directional LBT procedures. In some examples, a base station 105 may send a PDCCH switching indication for RAT 1 to cover all UEs 115 (e.g., including UE 115-k) whose beams are not in the allowed beam set on RAT 1 (e.g., on a first carrier). Additionally, base station 105 may signal UEs 115 (e.g., including UE 115-k) to skip PDCCH monitoring on the entire transmission opportunity (e.g., COT 710) on RAT 1 if their beams are not within the allowed beam set on RAT 1.

In some examples, the base station 105 may contend for access to an unlicensed wireless channel by performing one or more directional LBT procedures 705. The directional LBT procedures 705 may be successful on a set of one or more allowed beams (e.g., beam 205-n), and may be unsuccessful on a set of one or more non-allowed beams (e.g., beam 205-o). Upon gaining access to the wireless channel for the set of allowed beams, the base station 105 may start a COT 710. To support flexible start times of the COT 710 (e.g., without being limited to slot boundaries), UE 115-n and UE 115-o may monitor for PDCCH signaling during a first set of PDCCH monitoring occasions 715 according to a first monitoring pattern.

In some examples, the base station 105 may switch UE 115-j from a first monitoring pattern having first periodicity to a second monitoring pattern having a second periodicity. The base station 105 may send a control message 720 to UE 115-j over an allowed beam 205-n on RAT 1. The control message 720 may trigger a switch from the first monitoring pattern to the second monitoring pattern. The control message 720 may be included in a group common PDCCH (e.g., channel occupancy time system information (COT-SI)) or a UE-specific PDCCH, or the like. UE 115-j may receive the control message 720, and may switch from a first monitoring pattern to a second monitoring pattern for the remainder of COT 710. However, UE 115-k may not be able to receive control message 420 over allowed beam 205-i on RAT 1.

To improve power savings at UE 115-k, the base station 105 may send a control message 725 to UE 115-k over a beam 205-o on RAT 2. The control message 725 may be included in a group common PDCCH (e.g., channel occupancy time system information (COT-SI)) or a UE-specific PDCCH, or the like. In some examples, RAT 1 may be an unlicensed carrier and RAT 2 may be a licensed RAT. In some examples, RAT 1 may be a primary RAT and RAT 2 may be a secondary RAT, or RAT 2 may be a primary RAT and RAT 1 may be a secondary RAT. In some examples, the base station 105 may perform directional LBT procedures on RAT 1 and on RAT 2. In such examples, the base station 105 may gain access to beam 205-n on RAT 1, and may gain access to beam 205-o on RAT 2. In any of the above recited examples, or in any combination thereof, the base station 105 may determine that a directional transmission on beam 205-o on RAT 2 will be receivable by UE 115-k. Thus, base station 105 may rely on RAT 2 to send control message 725 indication for RAT 1 to cover UEs 115 whose beams are not in the allowed beam set on RAT 1 during COT 410.

UE 115-k may receive control message 725 over RAT 2. In some examples, the control message 725 may include an instruction to switch from a first monitoring pattern to a second monitoring pattern. The second monitoring pattern may include monitoring one or more PDCCH monitoring occasions 715 at a greater periodicity than the first periodicity (e.g., slot level monitoring). In some examples, the second monitoring pattern may include skipping PDCCH monitoring altogether for the remainder of COT 710. In such examples, UE 115-k may refrain from monitoring for PDCCH signaling until the expiration of COT 710. Upon expiration of COT 710, UE 115-k may revert to monitoring for PDCCH signaling according to the first monitoring pattern. UE 115-k may determine the end of COT 710 based on an indication included in one or more control message (e.g., control message 725). In some examples, UE 115-*k* may receive a separate control message at the end of COT 710 indicating the termination of COT 710.

Figure 8:
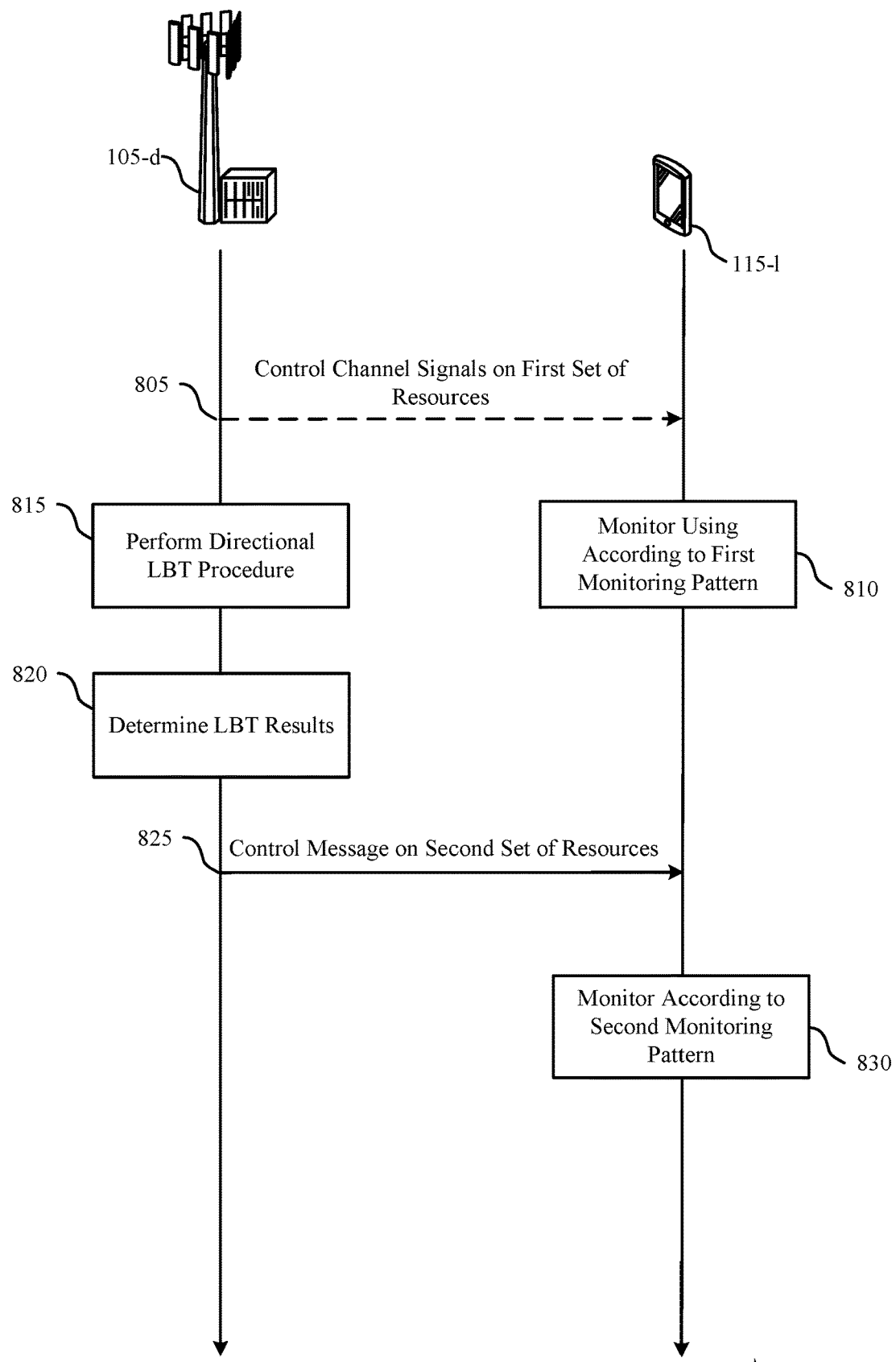
FIG. 8 illustrates an example of a process flow that supports power saving for downlink control channel monitoring in unlicensed bands in accordance with aspects of the present disclosure.

FIG. 8 illustrates an example of a process flow 800 that supports power saving for downlink control channel monitoring in unlicensed bands in accordance with aspects of the present disclosure. In some examples, process flow 800 may implement aspects of wireless communications system 100 and wireless communications system 200.

At 805, base station 105-*d* may transmit, on a wireless channel, control channel signals on a first set of resources (e.g., time, frequency, or spatial resources). Base station 105-*d* may transmit the control channel signaling during a first set of one or more downlink control channel monitoring occasions having a first pattern and periodicity (e.g., mini-slot level monitoring occasions).

At 810, UE 115-*l* may monitor a wireless channel for downlink control channel signaling during a first set of downlink control channel monitoring occasions according to a first monitoring pattern (e.g., mini-slot level monitoring). In some examples, UE 115-*l* may monitor for the downlink control channel signaling using the first set of resources. The first set of resources may include a first (e.g., allowed) beam, beams received from a first TRP, resources on a first carrier (e.g., an unlicensed carrier, a primary carrier, a secondary carrier, or the like) or resources reserved for a first RAT.

At 815, base station 105-*d* may perform one or more directional LBT procedures on one or more beams.

At 820, base station 105-*d* may determine that the directional LBT procedure was successful for a first subset of the one or more beams and that the LBT procedure failed for a second subset of the one or more beams.

At 825, base station 105-*d* may transmit a control message on a second set of resources (e.g., time, frequency, or spatial resources) to UE 115-*l*. For instance, base station 105-*d* may transmit a control message including an instruction to modify the monitoring of the wireless channel using the first set of resources during a second set of one or more downlink control channel monitoring occasions. The second set of resources may include a second beam (e.g., non-allowed beam on the first set of resources), beams received from a second TRP, resources on a second carrier (e.g., an unlicensed carrier, a licensed carrier, a primary carrier, a secondary carrier, or the like), resources reserved for sidelink communications, or resources reserved for a second RAT.

At 830, UE 115-*l* may monitor the wireless channel for downlink control channel signaling during a second set of downlink control channel monitoring occasions according to a second monitoring pattern. In some examples, the second monitoring pattern may have a second periodicity (e.g., slot level monitoring). In some examples, the second monitoring pattern may include skipping monitoring for the duration of a COT corresponding to the directional LBT procedures performed at 815.

Figure 9:
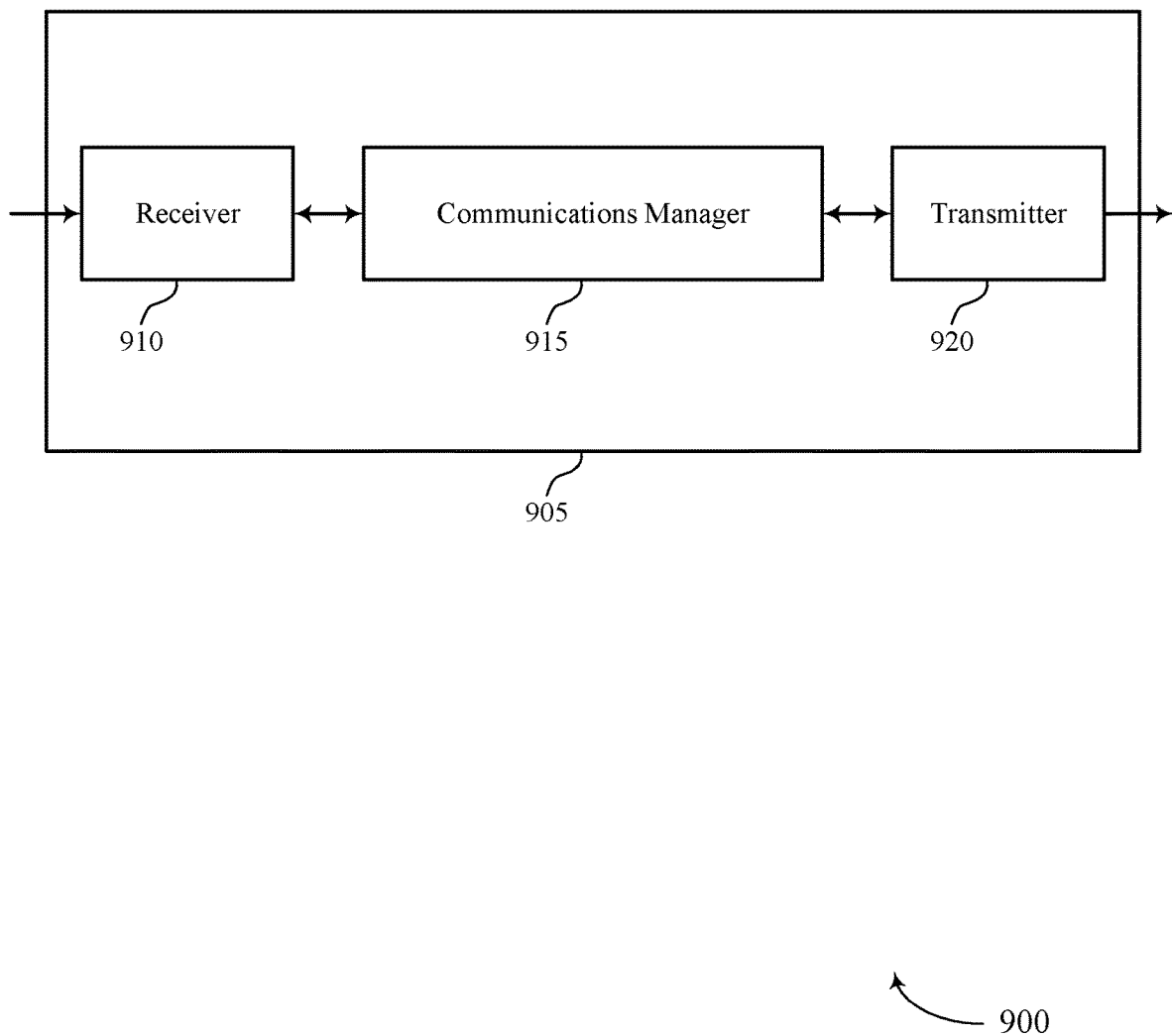
FIGS. 9 and 10 show block diagrams of devices that support power saving for downlink control channel monitoring in unlicensed bands in accordance with aspects of the present disclosure.

FIG. 9 shows a block diagram 900 of a device 905 that supports power saving for downlink control channel monitoring in unlicensed bands in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses). In some examples, communications manager 915 may be implemented by a modem. Communications manager 915 may communicate with transmitter 920 via a first interface. Communications manager 915 may output signals for transmission via the first interface. Communications manager 915 may interface with receiver 910 via a second interface. Communications manager 915 obtain signals (e.g., transmitted from a base station 105) via the second interface. In some examples, the modem may implement, via the first interface and the second interface, the techniques and methods described herein. Such techniques may result in improved efficiency, increased computational resources, longer-lasting battery at the device, and overall system efficiency.

The receiver 910 may receive information such as packets, user data, or control information associated with various information channels (e.g., control channels, data channels, and information related to power saving for downlink control channel monitoring in unlicensed bands, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may monitor, using a first set of resources, a wireless channel for downlink control channel signaling during a first set of downlink control channel monitoring occasions according to a first monitoring pattern, monitor, based on the control message, the wireless channel for downlink control channel signaling during a second set of downlink control channel monitoring occasions according to a second monitoring pattern, and receive, using a second set of resources, a control message including an instruction to modify the monitoring of the wireless channel using the first set of resources. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (e.g., amplifiers, filters, antennas) coupled with the mobile device modem to enable wireless transmission and reception over one or more bands.

The communications manager 915 as described herein may be implemented to realize one or more potential advantages. One implementation may allow the device to decrease power consumption, increase battery life, and improve user experience.

Figure 12:
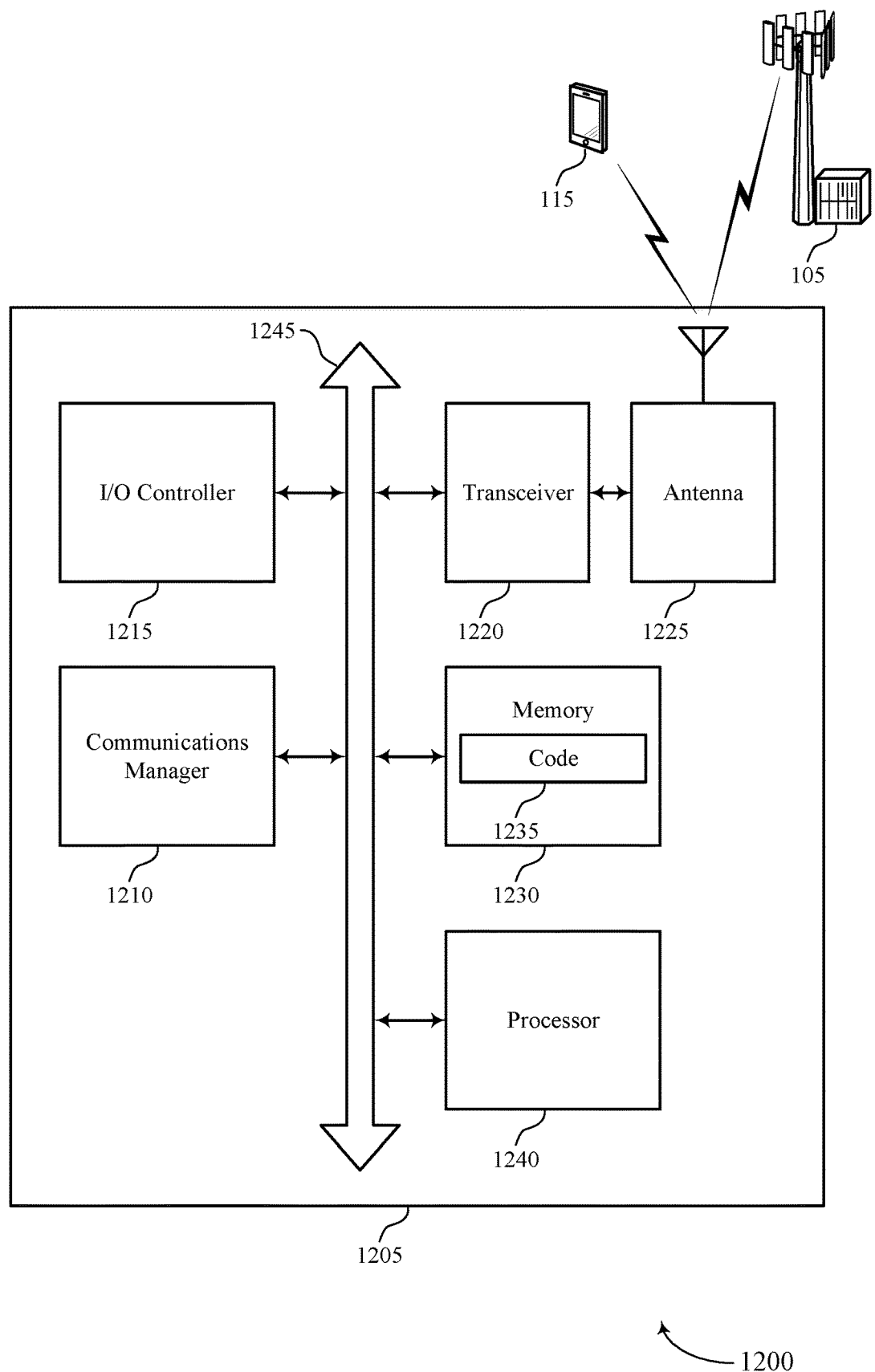
FIG. 12 shows a diagram of a system including a device that supports power saving for downlink control channel monitoring in unlicensed bands in accordance with aspects of the present disclosure.

Based on techniques for efficiently communicating maximum number of layers for a device as described herein, a processor of a UE 115 (e.g., controlling the receiver 910, the transmitter 920, or a transceiver 1220 as described with respect to FIG. 12) may increase system efficiency and decrease unnecessary processing at a device.

Figure 10:
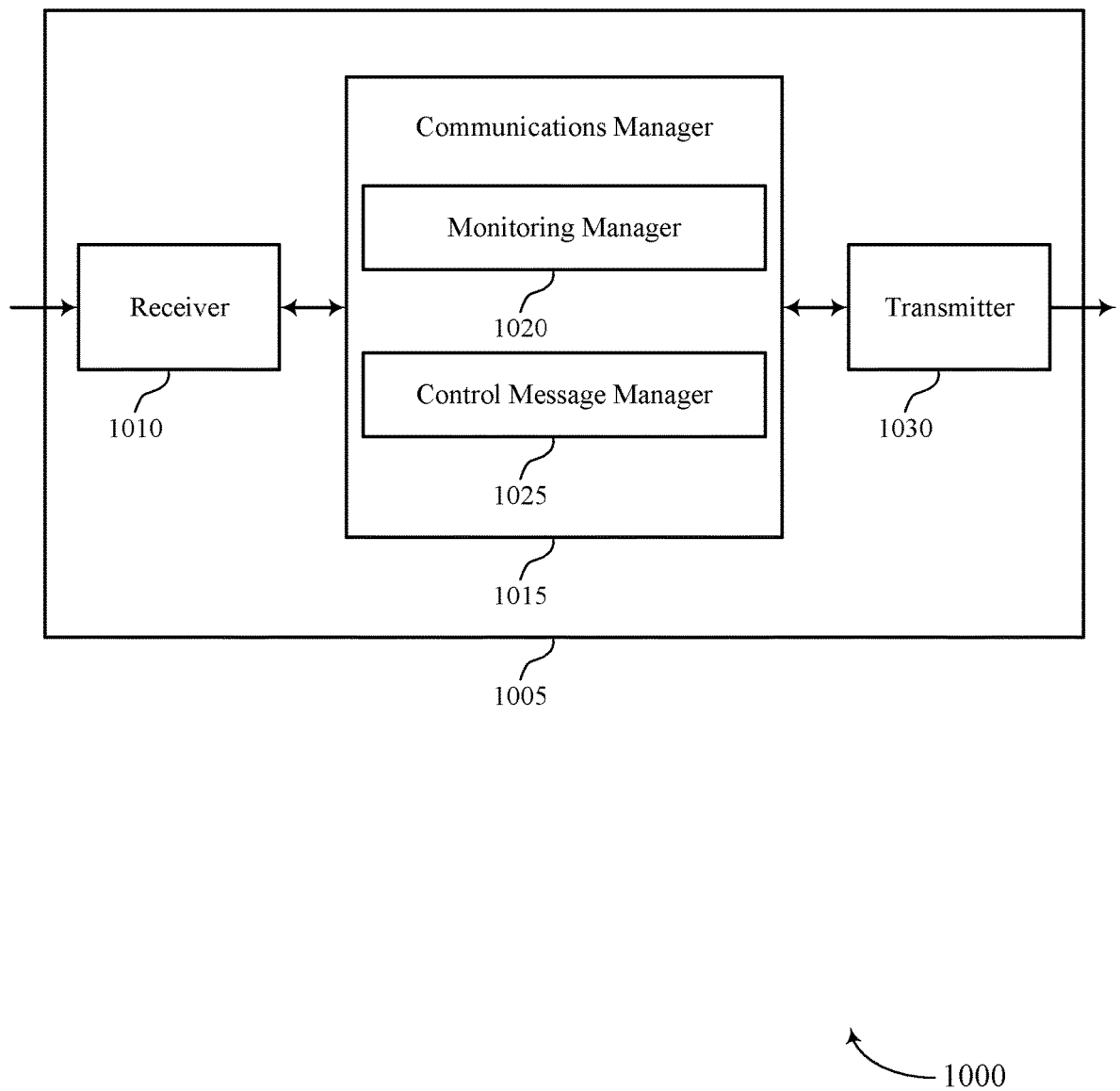

FIG. 10 shows a block diagram 1000 of a device 1005 that supports power saving for downlink control channel monitoring in unlicensed bands in accordance with aspects of the present disclosure. The device 1005 may be an example of aspects of a device 905, or a UE 115 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to power saving for downlink control channel monitoring in unlicensed bands, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a monitoring manager 1020 and a control message manager 1025. The communications manager 1015 may be an example of aspects of the communications manager 1210 described herein.

The monitoring manager 1020 may monitor, using a first set of resources, a wireless channel for downlink control channel signaling during a first set of downlink control channel monitoring occasions according to a first monitoring pattern and monitor, based on the control message, the wireless channel for downlink control channel signaling during a second set of downlink control channel monitoring occasions according to a second monitoring pattern.

The control message manager 1025 may receive, using a second set of resources, a control message including an instruction to modify the monitoring of the wireless channel using the first set of resources.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
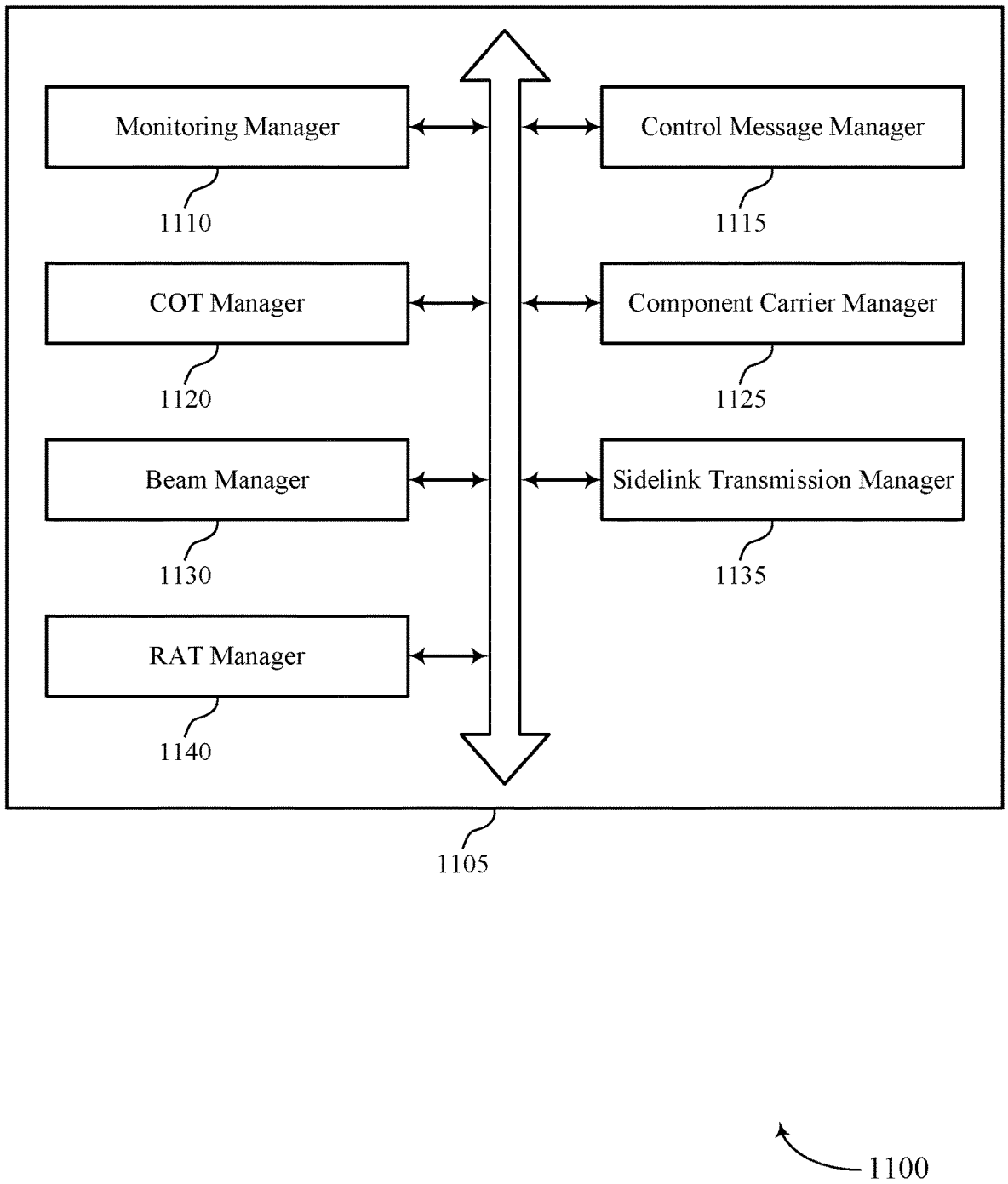
FIG. 11 shows a block diagram of a communications manager that supports power saving for downlink control channel monitoring in unlicensed bands in accordance with aspects of the present disclosure.

FIG. 11 shows a block diagram 1100 of a communications manager 1105 that supports power saving for downlink control channel monitoring in unlicensed bands in accordance with aspects of the present disclosure. The communications manager 1105 may be an example of aspects of a communications manager 915, a communications manager 1015, or a communications manager 1210 described herein. The communications manager 1105 may include a monitoring manager 1110, a control message manager 1115, a COT manager 1120, a component carrier manager 1125, a beam manager 1130, a sidelink transmission manager 1135, and a RAT manager 1140. Each of these modules may communicate, directly or indirectly, with one another (e.g., via one or more buses).

The monitoring manager 1110 may monitor, using a first set of resources, a wireless channel for downlink control channel signaling during a first set of downlink control channel monitoring occasions according to a first monitoring pattern. In some examples, the monitoring manager 1110 may monitor, based on the control message, the wireless channel for downlink control channel signaling during a second set of downlink control channel monitoring occasions according to a second monitoring pattern. In some examples, the monitoring manager 1110 may revert, upon expiration of the duration of the channel occupancy time, to the first monitoring pattern. In some examples, the monitoring manager 1110 may refrain from monitoring the wireless channel for the duration of the channel occupancy time. In some examples, the monitoring manager 1110 may refrain from monitoring for downlink control channel signaling using the first set of resources. In some cases, the first set of downlink control channel monitoring occasions has a first periodicity and the second set of downlink control channel monitoring occasions has a second periodicity that is greater than the first periodicity.

The control message manager 1115 may receive, using a second set of resources, a control message including an instruction to modify the monitoring of the wireless channel using the first set of resources. In some examples the first set of resources may include a first set of spatial resources, frequency resources, time resources, or a combination thereof, and the second set of resources may include a second set of spatial resources, frequency resources, time resources, or a combination thereof.

The COT manager 1120 may identify, based on the control message, a channel occupancy time during which a base station has gained access to the wireless channel, where monitoring the wireless channel for downlink control channel signaling during the second set of downlink control channel monitoring occasions includes switching from the first monitoring pattern to the second monitoring pattern for a duration of no more than the channel occupancy time.

The component carrier manager 1125 may refrain from monitoring for downlink control channel signaling using the first component carrier. In some cases, the first set of resources includes a first component carrier and the second set of resources includes a second component carrier. In some cases, the first component carrier is a shared component carrier and the second component carrier is a dedicated component carrier. In some cases, the first component carrier is a primary component carrier and the second component carrier is a secondary component carrier.

The beam manager 1130 may refrain from monitoring for downlink control channel signaling using the first set of one or more beams. In some cases, the first set of resources includes a first set of one or more beams, and the second set of spatial or frequency resources includes a second set of one or more beams.

The sidelink transmission manager 1135 may receive the control message, from the second UE, using the second set of resources allocated for sidelink communications. In some cases, the first set of resources is allocated for downlink communications from a base station, and the second set of resources is allocated for sidelink communications from a second UE.

The RAT manager 1140 may refrain from monitoring for downlink control channel signaling using the first RAT. In some cases, the first set of resources is associated with a first RAT and the second set of resources is associated with a second RAT. In some cases, the first RAT supports directional listen-before-talk procedures and the second RAT supports omni-directional listen-before-talk procedures or directional listen-before-talk procedures.

FIG. 12 shows a diagram of a system 1200 including a device 1205 that supports power saving for downlink control channel monitoring in unlicensed bands in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may monitor, using a first set of resources, a wireless channel for downlink control channel signaling during a first set of downlink control channel monitoring occasions according to a first monitoring pattern, monitor, based on the control message, the wireless channel for downlink control channel signaling during a second set of downlink control channel monitoring occasions according to a second monitoring pattern, and receive, using a second set of resources, a control message including an instruction to modify the monitoring of the wireless channel using the first set of resources. In some examples, upon receiving the control message using the second set of resources, a device 1205 may switch from the first monitoring pattern to the second monitoring pattern, which may result in increased power savings at the UE, increased battery life, increased system efficiency, and improved user experience.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output Operating System (BIOS) which may control basic hardware or software operation such as the interaction with peripheral components or devices.

The processor 1240 may include an intelligent hardware device, (e.g., a general-purpose processor, a digital signal processor (DSP), a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power saving for downlink control channel monitoring in unlicensed bands).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
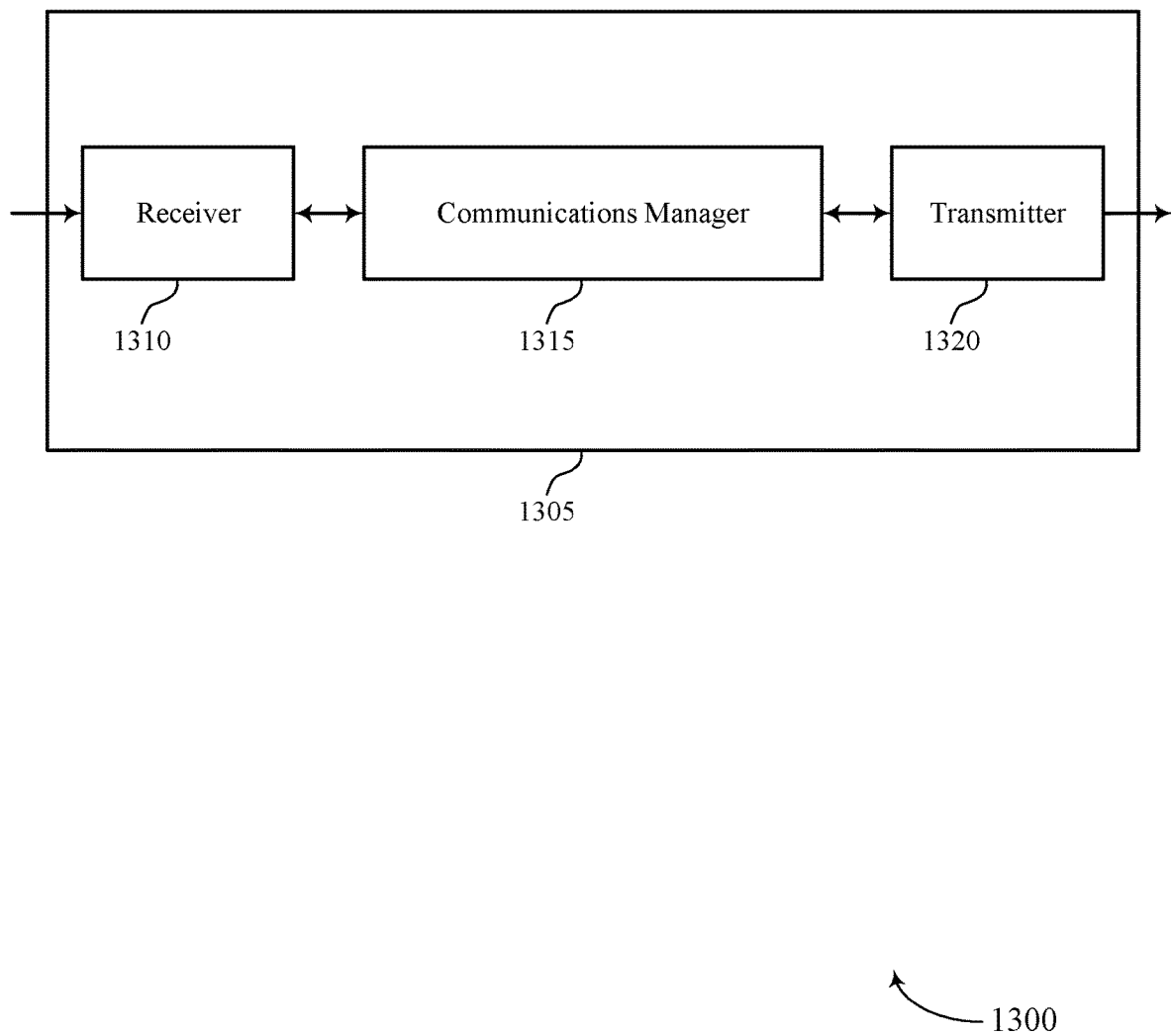
FIGS. 13 and 14 show block diagrams of devices that support power saving for downlink control channel monitoring in unlicensed bands in accordance with aspects of the present disclosure.

FIG. 13 shows a block diagram 1300 of a device 1305 that supports power saving for downlink control channel monitoring in unlicensed bands in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses). In some examples, communications manager 1315 may be implemented by a modem. Communications manager 1315 may communicate with transmitter 1320 via a first interface. Communications manager 1315 may output signals for transmission via the first interface. Communications manager 1315 may interface with receiver 1310 via a second interface. Communications manager 1315 may obtain signals (e.g., transmitted from a UE 115) via the second interface. In some examples, the modem may implement, via the first interface and the second interface, the techniques and methods described herein. Such techniques may result in improved efficiency, increased computational resources, longer-lasting battery at the device, and overall system efficiency.

The receiver 1310 may receive information such as packets, user data, or control information associated with various information channels (e.g., control channels, data channels, and information related to power saving for downlink control channel monitoring in unlicensed bands, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, using a first set of resources on a wireless channel for downlink control channel signaling, one or more downlink control channel signals during a first set of one or more downlink control channel monitoring occasions, perform a directional listen-before-talk procedure on one or more beams, determine that the directional listen-before-talk procedure was successful for a first subset of the one or more beams and that the directional listen-before-talk procedure failed for a second subset of the one or more beams, and transmit, to a first UE using a second set of resources including the second subset of the one or more beams, a control message including an instruction to modify the monitoring of the wireless channel using the first set of resources during a second set of one or more downlink control channel monitoring occasions. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
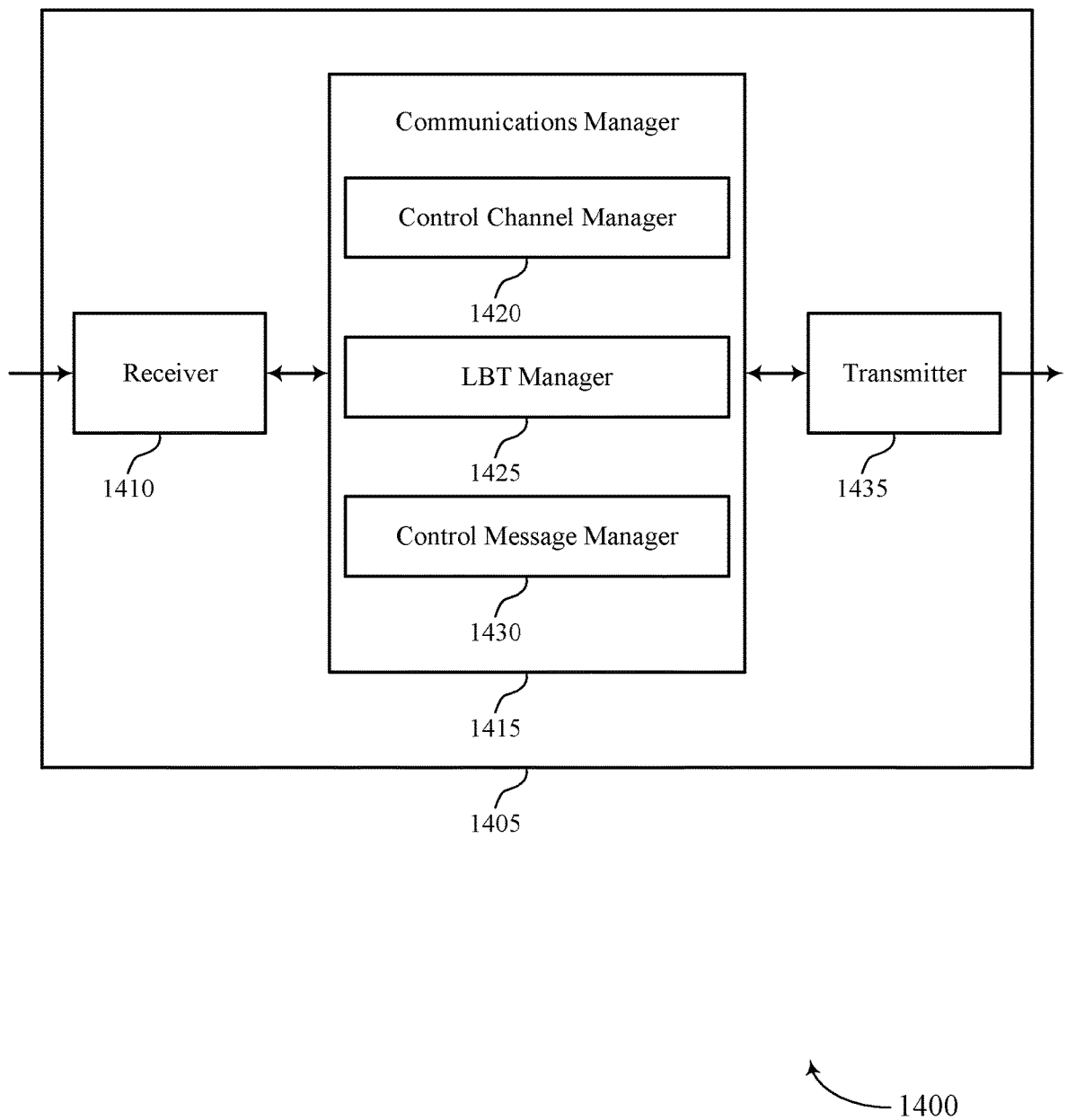

FIG. 14 shows a block diagram 1400 of a device 1405 that supports power saving for downlink control channel monitoring in unlicensed bands in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to power saving for downlink control channel monitoring in unlicensed bands, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a control channel manager 1420, a LBT manager 1425, and a control message manager 1430. The communications manager 1415 may be an example of aspects of the communications manager 1610 described herein.

The control channel manager 1420 may transmit, using a first set of resources on a wireless channel for downlink control channel signaling, one or more downlink control channel signals during a first set of one or more downlink control channel monitoring occasions. In some examples the first set of resources may include a first set of spatial resources, frequency resources, time resources, or a combination thereof, and the second set of resources may include a second set of spatial resources, frequency resources, time resources, or a combination thereof.

The LBT manager 1425 may perform a directional listen-before-talk procedure on one or more beams and determine that the directional listen-before-talk procedure was successful for a first subset of the one or more beams and that the directional listen-before-talk procedure failed for a second subset of the one or more beams.

The control message manager 1430 may transmit, to a first UE using a second set of resources including the second subset of the one or more beams, a control message including an instruction to modify the monitoring of the wireless channel using the first set of resources during a second set of one or more downlink control channel monitoring occasions.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
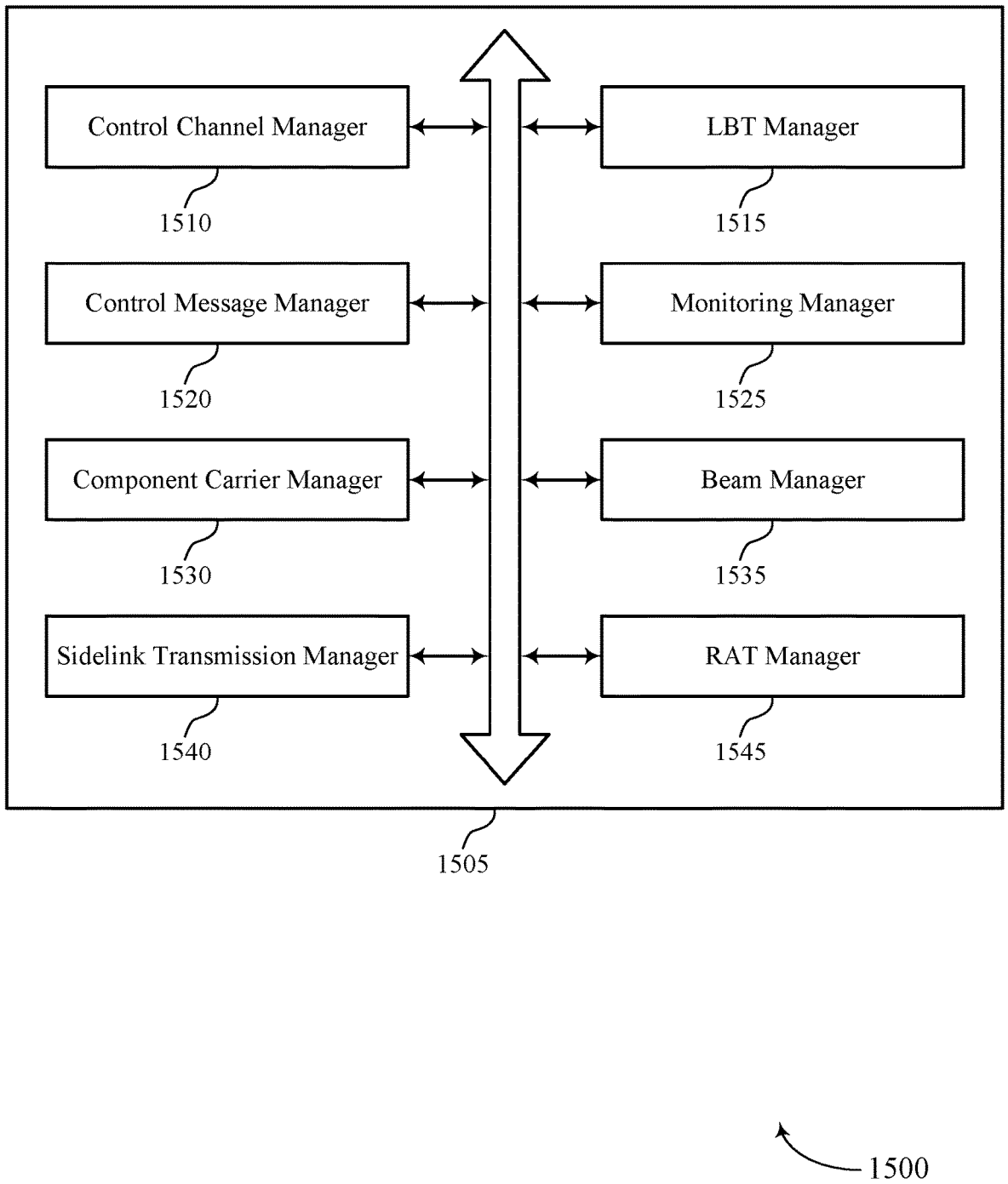
FIG. 15 shows a block diagram of a communications manager that supports power saving for downlink control channel monitoring in unlicensed bands in accordance with aspects of the present disclosure.

FIG. 15 shows a block diagram 1500 of a communications manager 1505 that supports power saving for downlink control channel monitoring in unlicensed bands in accordance with aspects of the present disclosure. The communications manager 1505 may be an example of aspects of a communications manager 1315, a communications manager 1415, or a communications manager 1610 described herein. The communications manager 1505 may include a control channel manager 1510, a LBT manager 1515, a control message manager 1520, a monitoring manager 1525, a component carrier manager 1530, a beam manager 1535, a sidelink transmission manager 1540, and a RAT manager 1545. Each of these modules may communicate, directly or indirectly, with one another (e.g., via one or more buses).

The control channel manager 1510 may transmit, using a first set of resources on a wireless channel for downlink control channel signaling, one or more downlink control channel signals during a first set of one or more downlink control channel monitoring occasions.

The LBT manager 1515 may perform a directional listen-before-talk procedure on one or more beams. In some examples, the LBT manager 1515 may determine that the directional listen-before-talk procedure was successful for a first subset of the one or more beams and that the directional listen-before-talk procedure failed for a second subset of the one or more beams. In some examples, identifying a set of UEs including the first UE, the set of UEs being capable of communicating using the second subset of the one or more beams; where the control message includes an indication of the second subset of the one or more beams, and where the instruction to modify the monitoring of the wireless channel using the first set of resources is based on the identifying the set of UEs capable of communicating using the second subset of the one or more beams. In some examples, identifying, based on performing the directional listen-before-talk procedure, a channel occupancy time during which the base station has gained access to the wireless channel, where the control message includes an instruction to modify the monitoring of the wireless channel for a duration of no more than the channel occupancy time. In some cases, the first set of one or more downlink control channel monitoring occasions has a first periodicity and the second set of downlink control channel monitoring occasions has a second periodicity that is greater than the first periodicity.

The control message manager 1520 may transmit, to a first UE using a second set of resources including the second subset of the one or more beams, a control message including an instruction to modify the monitoring of the wireless channel using the first set of resources during a second set of one or more downlink control channel monitoring occasions.

The monitoring manager 1525 may include, in the instruction to modify the monitoring of the wireless channel using the first set of resources, an instruction to switch from a first monitoring pattern corresponding to the first set of one or more downlink control channel monitoring occasions to a second monitoring pattern corresponding to a second set of downlink control channel monitoring occasions. In some cases, the instruction to modify the monitoring of the wireless channel further includes an instruction to refrain from monitoring the wireless channel for the duration of the channel occupancy time. In some cases, the instruction to modify the monitoring of the wireless channel using the first set of resources includes an instruction to refrain from monitoring for downlink control channel signaling using the first component carrier. In some cases, the instruction to modify the monitoring of the wireless channel using the first set of resources includes an instruction to refrain from monitoring for downlink control channel signaling using the first set of one or more beams.

In some cases, the instruction to modify the monitoring of the wireless channel using the first set of resources includes an instruction to refrain from monitoring for downlink control channel signaling using the first set of resources. In some cases, the instruction to modify the monitoring of the wireless channel using the first set of resources includes an instruction to refrain from monitoring for downlink control channel signaling using the first RAT.

The component carrier manager 1530 may identify that the first set of resources includes a first component carrier and the second set of resources includes a second component carrier, and may receive control messages over one or both of the first component carrier and the second component carrier. In some cases, the first component carrier is a shared component carrier and the second component carrier is a dedicated component carrier. In some cases, the first component carrier is a primary component carrier and the second component carrier is a secondary component carrier.

The beam manager 1535 may transmit, from a first transmit/receive point (TRP) to a second TRP, a command to relay the control message to the first UE using the second set of resources. In some cases, the first set of resources includes a first set of one or more beams, and the second set of frequency resources includes a second set of one or more beams.

The sidelink transmission manager 1540 may transmit a sidelink instruction to a second UE, the instruction including a command to use the second set of resources allocated for sidelink communications to convey the control message to the first UE. In some cases, the first set of resources is allocated for downlink communications from the base station, and the second set of resources is allocated for sidelink communications between the first UE and the second UE.

The RAT manager 1545 may identify that the first set of resources is associated with a first RAT and the second set of resources is associated with a second RAT, and may receive one or more control messages via the first RAT, the second RAT, or both. In some cases, the first RAT supports directional listen-before-talk procedures and the second RAT supports omni-directional listen-before-talk procedures or directional listen-before-talk procedures.

Figure 16:
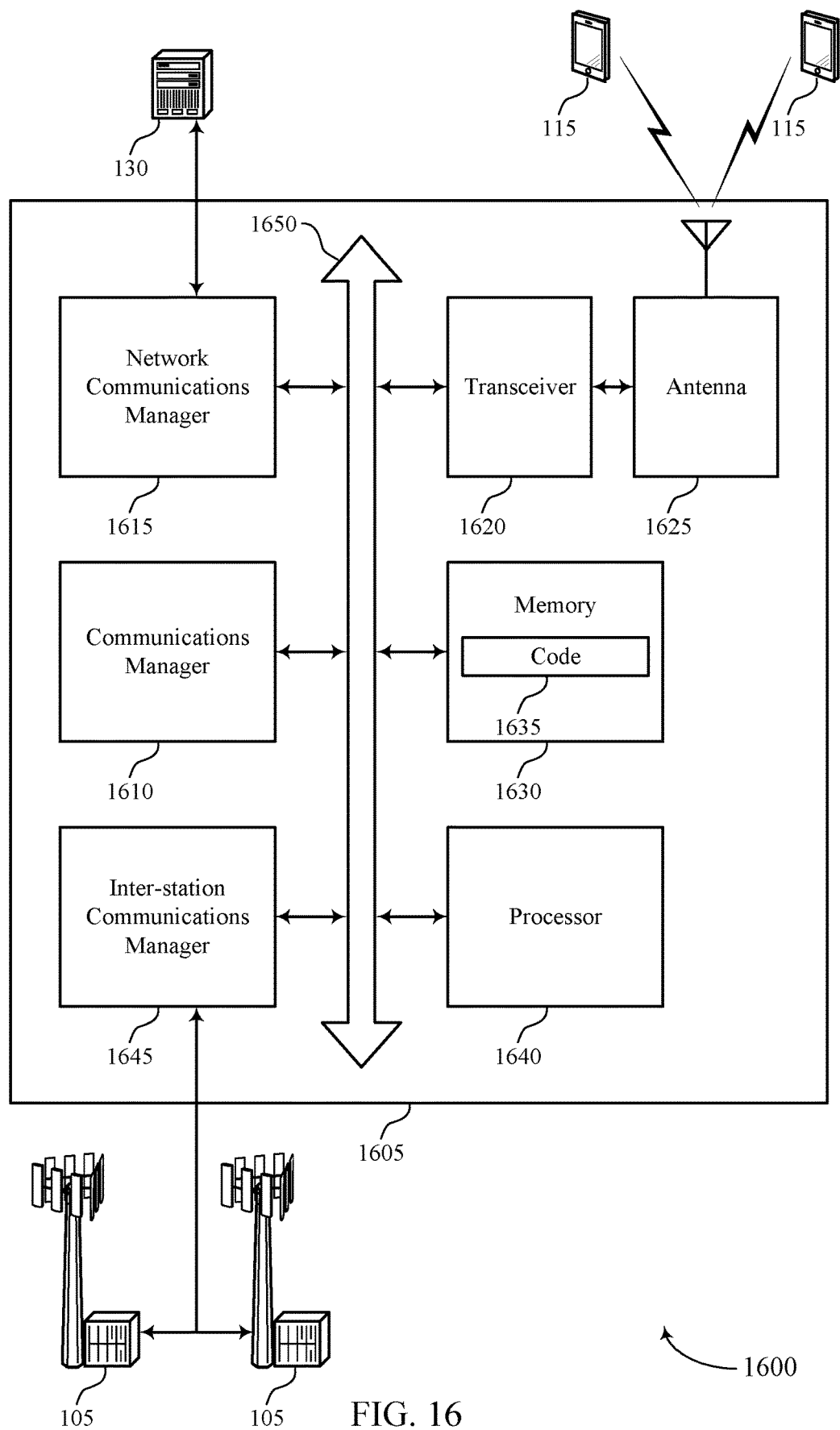
FIG. 16 shows a diagram of a system including a device that supports power saving for downlink control channel monitoring in unlicensed bands in accordance with aspects of the present disclosure.

FIG. 16 shows a diagram of a system 1600 including a device 1605 that supports power saving for downlink control channel monitoring in unlicensed bands in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit, using a first set of resources on a wireless channel for downlink control channel signaling, one or more downlink control channel signals during a first set of one or more downlink control channel monitoring occasions, perform a directional listen-before-talk procedure on one or more beams, determine that the directional listen-before-talk procedure was successful for a first subset of the one or more beams and that the directional listen-before-talk procedure failed for a second subset of the one or more beams, and transmit, to a first UE using a second set of resources including the second subset of the one or more beams, a control message including an instruction to modify the monitoring of the wireless channel using the first set of resources during a second set of one or more downlink control channel monitoring occasions.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting power saving for downlink control channel monitoring in unlicensed bands).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
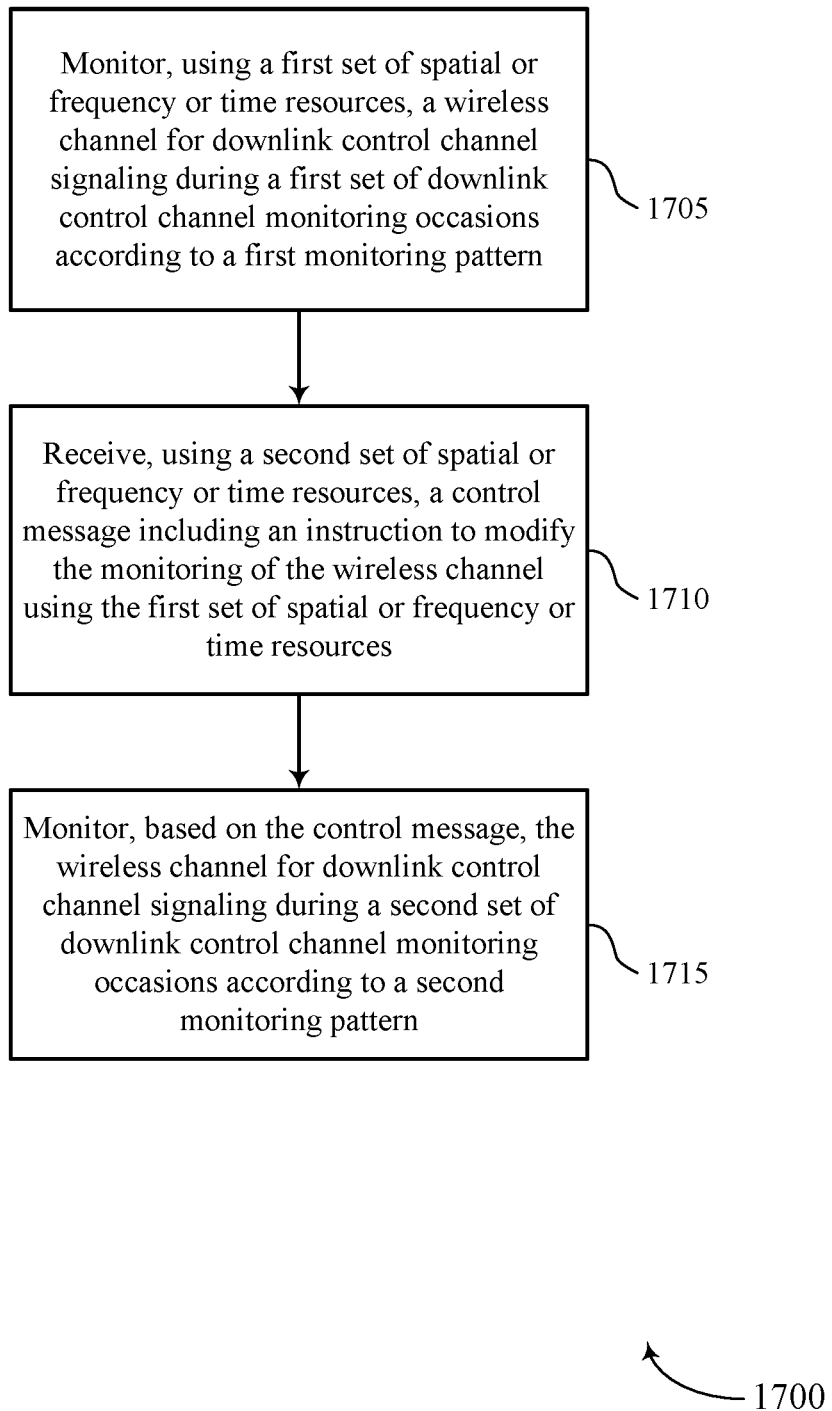
FIGS. 17 through 19 show flowcharts illustrating methods that support power saving for downlink control channel monitoring in unlicensed bands in accordance with aspects of the present disclosure.

FIG. 17 shows a flowchart illustrating a method 1700 that supports power saving for downlink control channel monitoring in unlicensed bands in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may monitor, using a first set of resources, a wireless channel for downlink control channel signaling during a first set of downlink control channel monitoring occasions according to a first monitoring pattern. The operations of 1705 may be performed according to the methods described herein. In some examples, aspects of the operations of 1705 may be performed by a monitoring manager as described with reference to FIGS. 9 through 12.

At 1710, the UE may receive, using a second set of resources, a control message including an instruction to modify the monitoring of the wireless channel using the first set of resources. The operations of 1710 may be performed according to the methods described herein. In some examples, aspects of the operations of 1710 may be performed by a control message manager as described with reference to FIGS. 9 through 12.

At 1715, the UE may monitor, based on the control message, the wireless channel for downlink control channel signaling during a second set of downlink control channel monitoring occasions according to a second monitoring pattern. The operations of 1715 may be performed according to the methods described herein. In some examples, aspects of the operations of 1715 may be performed by a monitoring manager as described with reference to FIGS. 9 through 12.

Figure 18:
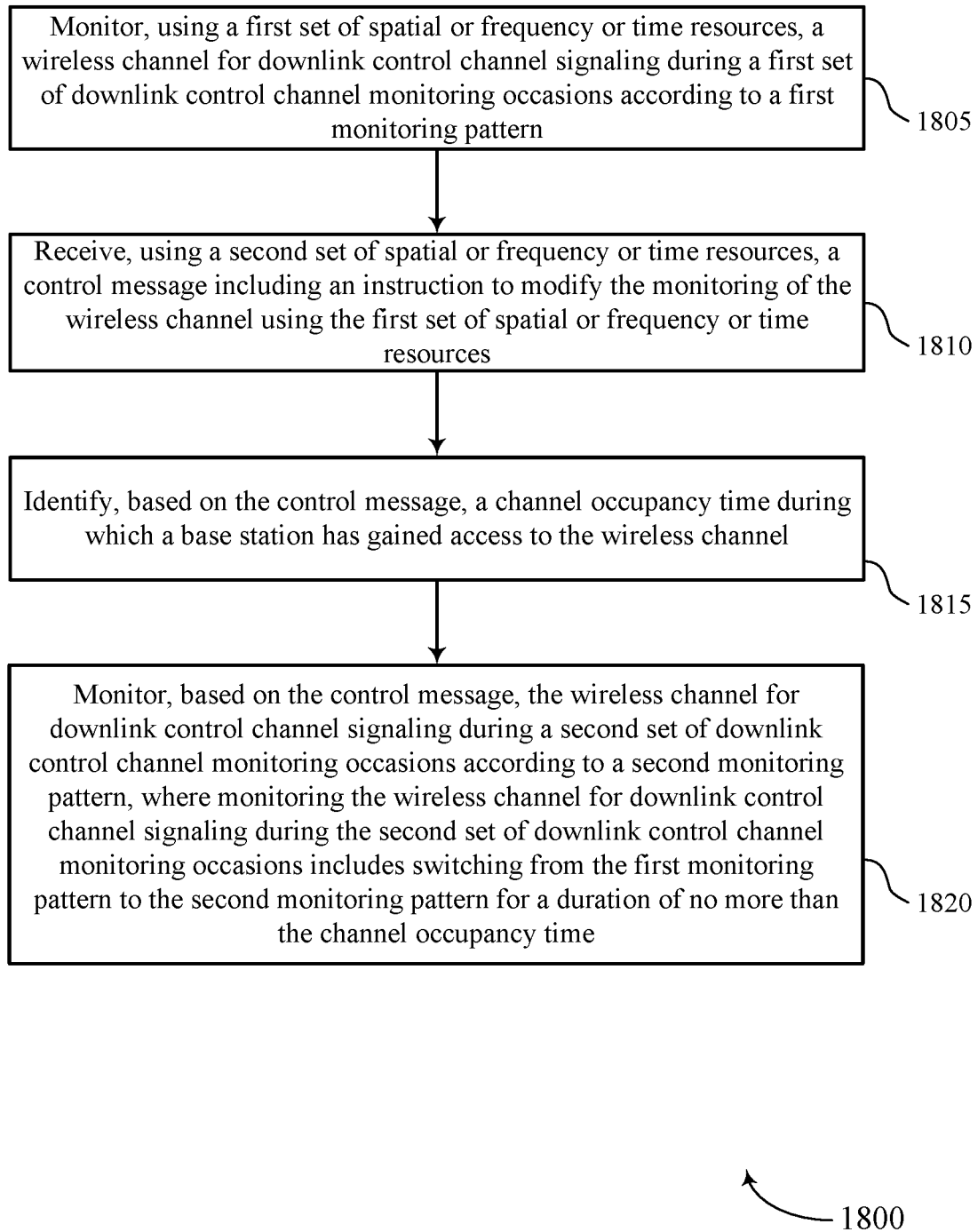

FIG. 18 shows a flowchart illustrating a method 1800 that supports power saving for downlink control channel monitoring in unlicensed bands in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1805, the UE may monitor, using a first set of resources, a wireless channel for downlink control channel signaling during a first set of downlink control channel monitoring occasions according to a first monitoring pattern. The operations of 1805 may be performed according to the methods described herein. In some examples, aspects of the operations of 1805 may be performed by a monitoring manager as described with reference to FIGS. 9 through 12.

At 1810, the UE may receive, using a second set of resources, a control message including an instruction to modify the monitoring of the wireless channel using the first set of resources. The operations of 1810 may be performed according to the methods described herein. In some examples, aspects of the operations of 1810 may be performed by a control message manager as described with reference to FIGS. 9 through 12.

At 1815, the UE may identify, based on the control message, a channel occupancy time during which a base station has gained access to the wireless channel. The operations of 1815 may be performed according to the methods described herein. In some examples, aspects of the operations of 1815 may be performed by a COT manager as described with reference to FIGS. 9 through 12.

At 1820, the UE may monitor, based on the control message, the wireless channel for downlink control channel signaling during a second set of downlink control channel monitoring occasions according to a second monitoring pattern. Monitoring the wireless channel for downlink control channel signaling during the second set of downlink control channel monitoring occasions may include switching from the first monitoring pattern to the second monitoring pattern for a duration of no more than the channel occupancy time. The operations of 1820 may be performed according to the methods described herein. In some examples, aspects of the operations of 1820 may be performed by a monitoring manager as described with reference to FIGS. 9 through 12.

Figure 19:
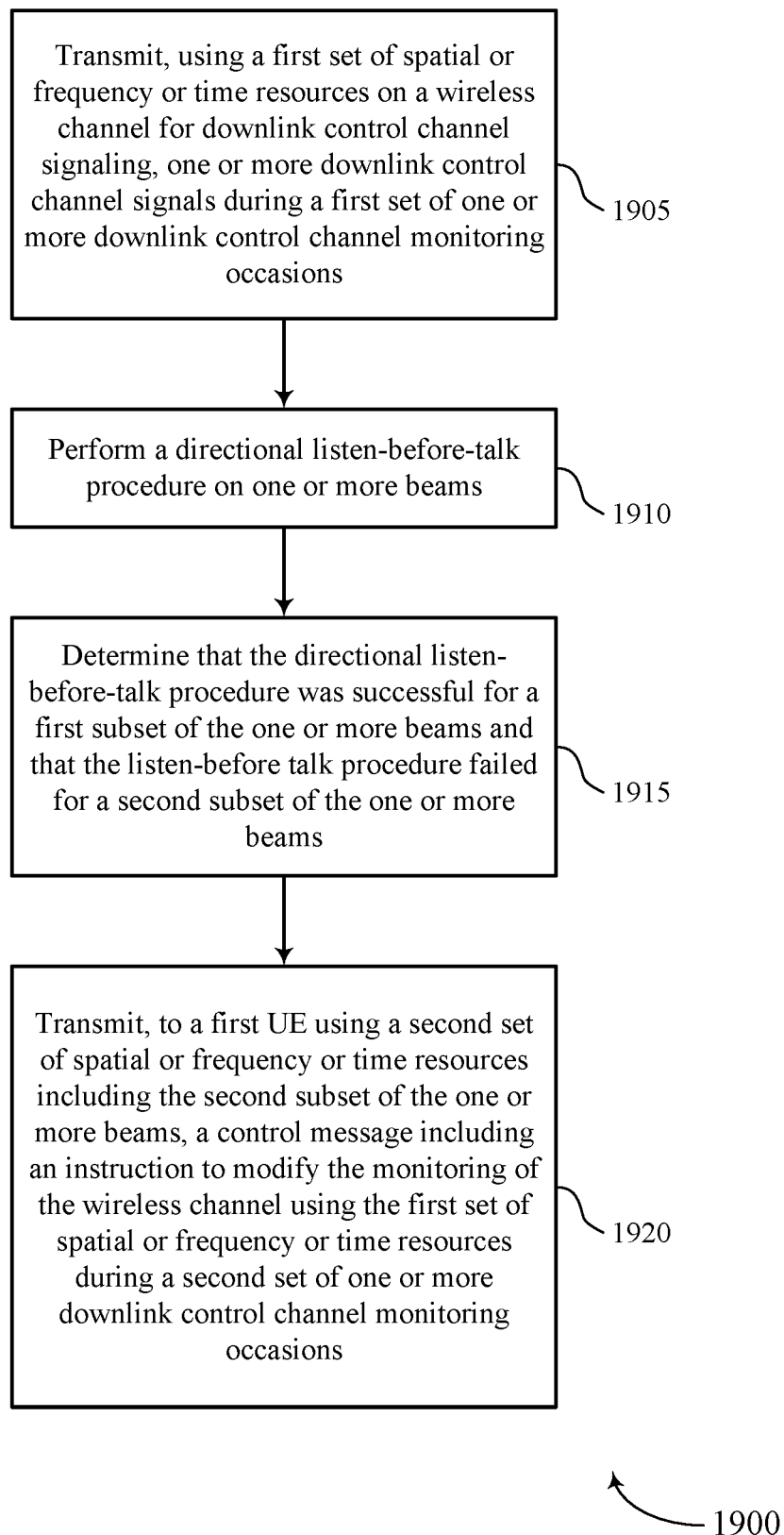

FIG. 19 shows a flowchart illustrating a method 1900 that supports power saving for downlink control channel monitoring in unlicensed bands in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1905, the base station may transmit, using a first set of resources on a wireless channel for downlink control channel signaling, one or more downlink control channel signals during a first set of one or more downlink control channel monitoring occasions. The operations of 1905 may be performed according to the methods described herein. In some examples, aspects of the operations of 1905 may be performed by a control channel manager as described with reference to FIGS. 13 through 16.

At 1910, the base station may perform a directional listen-before-talk procedure on one or more beams. The operations of 1910 may be performed according to the methods described herein. In some examples, aspects of the operations of 1910 may be performed by an LBT manager as described with reference to FIGS. 13 through 16.

At 1915, the base station may determine that the directional listen-before-talk procedure was successful for a first subset of the one or more beams and that the directional listen-before-talk procedure failed for a second subset of the one or more beams. The operations of 1915 may be performed according to the methods described herein. In some examples, aspects of the operations of 1915 may be performed by an LBT manager as described with reference to FIGS. 13 through 16.

At 1920, the base station may transmit, to a first UE using a second set of resources including the second subset of the one or more beams, a control message including an instruction to modify the monitoring of the wireless channel using the first set of resources during a second set of one or more downlink control channel monitoring occasions. The operations of 1920 may be performed according to the methods described herein. In some examples, aspects of the operations of 1920 may be performed by a control message manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
monitoring, using a first set of resources, a wireless channel for downlink control channel signaling during a first set of downlink control channel monitoring occasions according to a first monitoring pattern;
receiving, using a second set of resources different from the first set of resources, a control message comprising an instruction to modify the monitoring of the wireless channel using the first set of resources; and
monitoring, based at least in part on the control message, the wireless channel for downlink control channel signaling during a second set of downlink control channel monitoring occasions according to a second monitoring pattern.

2. The method of claim 1, further comprising:
identifying, based at least in part on the control message, a channel occupancy time during which an access network entity has gained access to the wireless channel, wherein monitoring the wireless channel for downlink control channel signaling during the second set of downlink control channel monitoring occasions comprises switching from the first monitoring pattern to the second monitoring pattern for a duration of no more than the channel occupancy time.

3. The method of claim 2, further comprising:
reverting, upon expiration of the duration of the channel occupancy time, to the first monitoring pattern.

4. The method of claim 2, wherein monitoring the wireless channel for downlink control channel signaling during the second set of downlink control channel monitoring occasions according to the second monitoring pattern comprises:
refraining from monitoring the wireless channel for the duration of the channel occupancy time.

5. The method of claim 1, wherein the first set of downlink control channel monitoring occasions has a first periodicity and the second set of downlink control channel monitoring occasions has a second periodicity that is greater than the first periodicity.

6. The method of claim 1, wherein the first set of resources comprises a first component carrier and the second set of resources comprises a second component carrier.

7. The method of claim 6, wherein monitoring the wireless channel for downlink control channel signaling during the second set of downlink control channel monitoring occasions according to the second monitoring pattern further comprises:
refraining from monitoring for downlink control channel signaling using the first component carrier.

8. The method of claim 1, wherein the first set of resources comprises a first set of one or more beams, and the second set of resources comprises a second set of one or more beams.

9. The method of claim 8, wherein monitoring the wireless channel for downlink control channel signaling during the second set of downlink control channel monitoring occasions according to the second monitoring pattern further comprises:
refraining from monitoring for downlink control channel signaling using the first set of one or more beams.

10. The method of claim 1, wherein the first set of resources is allocated for downlink communications from an access network entity, and the second set of resources is allocated for sidelink communications from a second UE.

11. The method of claim 10, wherein receiving the control message further comprises:
receiving the control message, from the second UE, using the second set of resources allocated for sidelink communications.

12. The method of claim 10, wherein monitoring the wireless channel for downlink control channel signaling during the second set of downlink control channel monitoring occasions according to the second monitoring pattern further comprises:
refraining from monitoring for downlink control channel signaling using the first set of resources.

13. The method of claim 1, wherein the first set of resources is associated with a first radio access technology (RAT) and the second set of resources is associated with a second RAT.

14. The method of claim 13, wherein monitoring the wireless channel for downlink control channel signaling during the second set of downlink control channel monitoring occasions according to the second monitoring pattern further comprises:
refraining from monitoring for downlink control channel signaling using the first RAT.

15. The method of claim 13, wherein the first RAT supports directional listen-before-talk procedures and the second RAT supports omni-directional listen-before-talk procedures or directional listen-before-talk procedures.

16. The method of claim 1, wherein the first set of resources comprises a first set of spatial resources, frequency resources, time resources, or a combination thereof, and wherein the second set of resources comprises a second set of spatial resources, frequency resources, time resources, or a combination thereof.

17. An apparatus for wireless communications at a user equipment (UE), comprising:
a first interface:
a second interface; and
a modem coupled to the first interface and the second interface, wherein the modem is configured to:
monitor, using a first set of resources, a wireless channel for downlink control channel signaling during a first set of downlink control channel monitoring occasions according to a first monitoring pattern;
obtain over the second interface, using a second set of resources different from the first set of resources, a control message comprising an instruction to modify the monitoring of the wireless channel using the first set of resources; and
monitor, based at least in part on the control message, the wireless channel for downlink control channel signaling during a second set of downlink control channel monitoring occasions according to a second monitoring pattern.

18. The apparatus of claim 17, wherein the modem is further configured to:
identify, based at least in part on the control message, a channel occupancy time during which an access network entity has gained access to the wireless channel, wherein monitoring the wireless channel for downlink control channel signaling during the second set of downlink control channel monitoring occasions comprises switching from the first monitoring pattern to the second monitoring pattern for a duration of no more than the channel occupancy time.

19. The apparatus of claim 18, wherein the modem is further configured to:
revert, upon expiration of the duration of the channel occupancy time, to the first monitoring pattern.

20. The apparatus of claim 18, wherein the modem is configured to monitor the wireless channel for downlink control channel signaling during the second set of downlink control channel monitoring occasions according to the second monitoring pattern and the modem is further configured to:
refrain from monitoring the wireless channel for the duration of the channel occupancy time.

21. The apparatus of claim 17, wherein the first set of downlink control channel monitoring occasions has a first periodicity and the second set of downlink control channel monitoring occasions has a second periodicity that is greater than the first periodicity.

22. The apparatus of claim 17, wherein the first set of resources comprises a first component carrier and the second set of resources comprises a second component carrier.

23. The apparatus of claim 22, wherein the modem is configured to monitor the wireless channel for downlink control channel signaling during the second set of downlink control channel monitoring occasions according to the second monitoring pattern and the modem is further configured to:
refrain from monitoring for downlink control channel signaling using the first component carrier.

24. The apparatus of claim 17, wherein the first set of resources comprises a first set of one or more beams, and the second set of resources comprises a second set of one or more beams.

25. The apparatus of claim 24, wherein the modem is configured to monitor the wireless channel for downlink control channel signaling during the second set of downlink control channel monitoring occasions according to the second monitoring pattern and the modem is further configured to:
refrain from monitoring for downlink control channel signaling using the first set of one or more beams.

26. The apparatus of claim 17, wherein the first set of resources is allocated for downlink communications from an access network entity, and the second set of resources is allocated for sidelink communications from a second UE.

27. The apparatus of claim 26, wherein the modem is further configured to:
   receive the control message, from the second UE, using the second set of resources allocated for sidelink communications.

28. The apparatus of claim 26, wherein the modem is configured to monitor the wireless channel for downlink control channel signaling during the second set of downlink control channel monitoring occasions according to the second monitoring pattern and the modem is further configured to:
   refrain from monitoring for downlink control channel signaling using the first set of resources.

29. The apparatus of claim 17, wherein the first set of resources is associated with a first radio access technology (RAT) and the second set of resources is associated with a second RAT.

30. The apparatus of claim 29, wherein the modem is configured to monitor the wireless channel for downlink control channel signaling during the second set of downlink control channel monitoring occasions according to the second monitoring pattern and the modem is further configured to:
   refrain from monitoring for downlink control channel signaling using the first RAT.

* * * * *